United States Patent
Arai et al.

(10) Patent No.: US 10,458,492 B2
(45) Date of Patent: Oct. 29, 2019

(54) POWER TRANSFER DEVICE FOR VEHICLE AND CONTROL METHOD OF POWER TRANSFER DEVICE

(71) Applicant: TOYOTA JIDOSHA KABUSHIKI KAISHA, Toyota-shi, Aichi-ken (JP)

(72) Inventors: Masayuki Arai, Toyota (JP); Satoshi Ishida, Kitanagoya (JP); Shota Murai, Nissin (JP); Taito Goto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 15/993,743

(22) Filed: May 31, 2018

(65) Prior Publication Data

US 2019/0017557 A1    Jan. 17, 2019

(30) Foreign Application Priority Data

Jul. 14, 2017    (JP) .................................. 2017-138543

(51) Int. Cl.
*F16D 48/06* (2006.01)
*B60K 17/02* (2006.01)
(Continued)

(52) U.S. Cl.
CPC .............. *F16D 48/06* (2013.01); *B60K 17/02* (2013.01); *B60K 17/34* (2013.01); *B60K 17/344* (2013.01); *B60K 17/3462* (2013.01); *B60K 17/3467* (2013.01); *B60K 17/35* (2013.01); *B60K 23/0808* (2013.01); *F16D 13/52* (2013.01); *F16D 23/12* (2013.01); *F16D 28/00* (2013.01);
(Continued)

(58) Field of Classification Search
CPC ....... F16H 2025/2046; F16H 2025/209; F16H 2025/2062; F16H 2025/2068; F16H 2025/2075–2084; F16H 25/20; F16H 25/12; F16H 37/124; F16D 2023/123; F16D 23/12; F16D 48/06; F16D 48/064; F16D 2500/1023; F16D 2500/3021; B60Y 2300/84; B60K 23/0808; B60K 2023/0816; B60K 2023/0825; B60K 2023/0841; B60K 2023/0858; B60K 17/35; B60K 17/3462

See application file for complete search history.

(56) References Cited

U.S. PATENT DOCUMENTS

2004/0214688 A1*  10/2004  Takasaki ............... F16H 61/12
                                                          477/115
2014/0343807 A1*  11/2014  Maki ..................... F16H 61/68
                                                          701/51

(Continued)

FOREIGN PATENT DOCUMENTS

DE    102015119133 A1    5/2017
EP        3009293 A1    4/2016

(Continued)

*Primary Examiner* — Erin D Bishop
(74) *Attorney, Agent, or Firm* — Oliff PLC

(57) ABSTRACT

An electronic control unit executes gradual reduction control when a friction clutch is to be maintained in a fully engaged state such that an input rotary member and an output rotary member rotate integrally. As a result, a motor current supplied to a motor is adjusted to a lower current value. Thus, an average current value of the motor current supplied to the motor when the friction clutch is to be maintained in the fully engaged state is appropriately reduced.

4 Claims, 12 Drawing Sheets

(51) Int. Cl.

| | | |
|---|---|---|
| *B60K 17/344* | (2006.01) | |
| *F16D 28/00* | (2006.01) | |
| *F16H 1/16* | (2006.01) | |
| *F16D 13/52* | (2006.01) | |
| *F16H 25/12* | (2006.01) | |
| *F16H 25/20* | (2006.01) | |
| *F16H 37/12* | (2006.01) | |
| *B60K 17/34* | (2006.01) | |
| *B60K 23/08* | (2006.01) | |
| *B60K 17/346* | (2006.01) | |
| *B60K 17/35* | (2006.01) | |
| *F16D 23/12* | (2006.01) | |

(52) U.S. Cl.
CPC ............ *F16D 48/064* (2013.01); *F16H 1/16* (2013.01); *F16H 25/12* (2013.01); *F16H 25/20* (2013.01); *F16H 37/124* (2013.01); *B60K 2023/0858* (2013.01); *B60Y 2300/84* (2013.01); *B60Y 2400/301* (2013.01); *B60Y 2400/303* (2013.01); *B60Y 2400/3032* (2013.01); *B60Y 2400/424* (2013.01); *F16D 2023/123* (2013.01); *F16D 2500/1023* (2013.01); *F16D 2500/3021* (2013.01); *F16D 2500/501* (2013.01); *F16H 2025/209* (2013.01)

(56) References Cited

U.S. PATENT DOCUMENTS

2017/0087985 A1* 3/2017 Imafuku ................ B60K 17/34
2017/0130787 A1   5/2017 Sorge et al.

FOREIGN PATENT DOCUMENTS

| JP | 2017-065669 A | 4/2017 |
|---|---|---|
| WO | 2016/111973 A1 | 7/2016 |

* cited by examiner

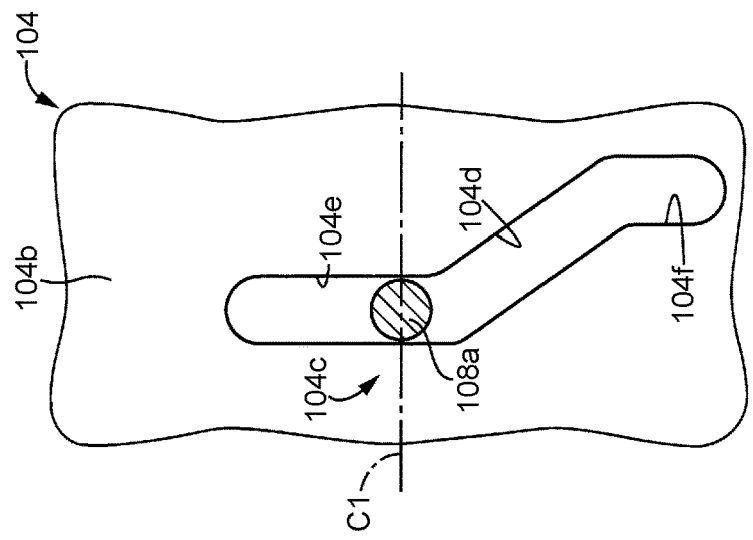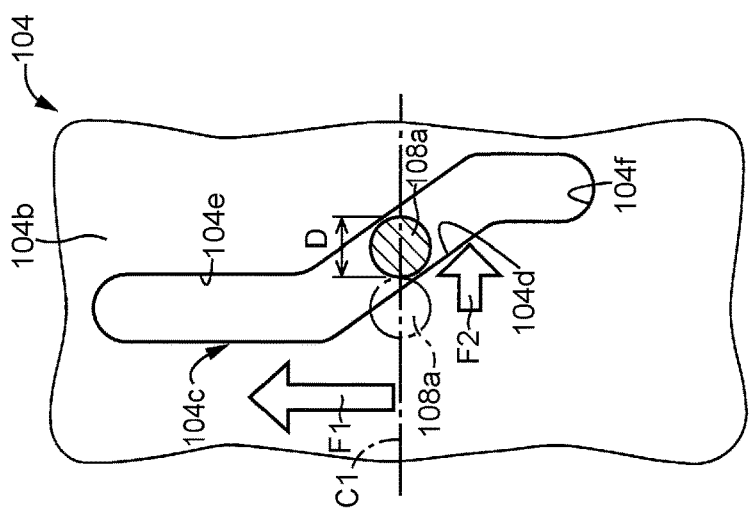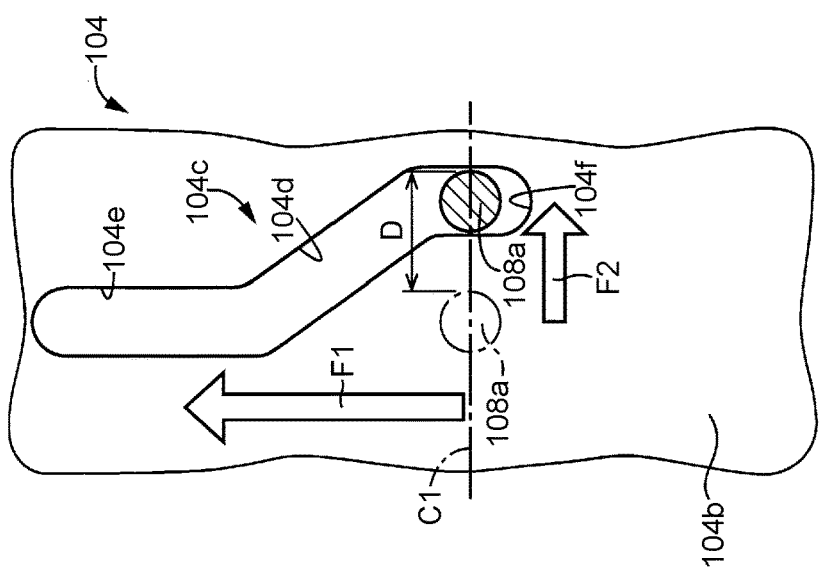

POWER TRANSFER DEVICE FOR VEHICLE AND CONTROL METHOD OF POWER TRANSFER DEVICE

INCORPORATION BY REFERENCE

The disclosure of Japanese Patent Application No. 2017-138543 filed on Jul. 14, 2017 including the specification, drawings and abstract is incorporated herein by reference in its entirety.

BACKGROUND

1. Technical Field

The present disclosure relates to a power transfer device for a vehicle including a friction clutch, a motor, a worm speed-reduction gear mechanism, a conversion mechanism, and an electronic control unit, and to a method and technique of controlling a power transfer device.

2. Description of Related Art

There is a known vehicle power transfer device including: a friction clutch that adjusts a transmission torque to be transmitted from an input rotary member to an output rotary member; a motor; a worm speed-reduction gear mechanism having a worm that is provided on a shaft of the motor and a worm wheel that meshes with the worm; and a conversion mechanism that generates a pressing force of the friction clutch by converting a rotary motion of the worm wheel into a linear motion. One example of such a device is the transfer described in Japanese Patent Application Publication No. 2017-65669 (JP 2017-65669 A).

SUMMARY

To maintain the friction clutch in a fully engaged state in the transfer as described in JP 2017-65669 A such that the input rotary member and the output rotary member rotate integrally, it is conceivable, for example, to keep a constant rotation angle of the motor by feedback control. However, when a driving current to the motor is controlled so as to keep a constant rotation angle of the motor, i.e., a constant pressing force of the friction clutch, the motor current supplied to the motor varies and reaches a higher value. Thus, maintaining the friction clutch in the fully engaged state (lock state) is accompanied by an undesirable increase in the average current value of the motor current supplied to the motor.

The present disclosure achieves a lower average current value than hitherto of a motor current supplied to a motor when a friction clutch is to be maintained in a fully engaged state.

A first aspect of the present disclosure is a power transfer device for a vehicle. The power transfer device includes: a friction clutch configured to adjust a transmission torque to be transmitted from an input rotary member to an output rotary member; a motor; a worm speed-reduction gear mechanism including a worm that is provided on a shaft of the motor and a worm wheel that meshes with the worm; a conversion mechanism configured to generate a pressing force in the friction clutch by converting a rotary motion of the worm wheel into a linear motion; and an electronic control unit configured to control a rotation angle of the motor. The electronic control unit is configured to repeatedly execute rapid increase control and gradual reduction control when the friction clutch is to be maintained in a fully engaged state such that the input rotary member and the output rotary member rotate integrally. The rapid increase control is a control mode in which the rotation angle of the motor is increased to a first rotation angle at a first speed gradient. The first rotation angle is larger than a required rotation angle that is required to maintain the friction clutch in the fully engaged state. The gradual reduction control is a control mode in which the rotation angle of the motor having been increased by the rapid increase control is reduced to a second rotation angle at a second speed gradient. The second rotation angle is larger than or equal to the required rotation angle and smaller than the first rotation angle. The second speed gradient is smaller than the first speed gradient.

With this configuration, when the friction clutch is to be maintained in the fully engaged state such that the input rotary member and the output rotary member rotate integrally, the electronic control unit executes the gradual reduction control of gradually reducing the rotation angle of the motor to the second rotation angle, so that the motor current supplied to the motor is adjusted to a lower current value on an efficiency characteristic line of the pressing force generated in the friction clutch relative to the motor current supplied to the motor on a piston returning side. Thus, the average current value of the motor current supplied to the motor when the friction clutch is to be maintained in the fully engaged state is appropriately reduced, compared with if, for example, control is executed so as to keep a constant rotation angle of the motor when the friction clutch is to be maintained in the fully engaged state.

In the above power transfer device for the vehicle, the electronic control unit may be configured to temporarily increase the rotation angle of the motor from the second rotation angle to the first rotation angle by the rapid increase control when the rotation angle of the motor is reduced to the second rotation angle by the gradual reduction control. The rapid increase control may be a control mode in which the rotation angle of the motor is temporarily increased to the first rotation angle to increase the pressing force of the friction clutch, and the gradual reduction control may be a control mode in which the rotation angle of the motor is reduced from the first rotation angle to the second rotation angle to reduce the pressing force of the friction clutch.

With this configuration, when the friction clutch is to be maintained in the fully engaged state, the motor current supplied to the motor is appropriately reduced during the execution of the gradual reduction control of gradually reducing the rotation angle of the motor from the first rotation angle to the second rotation angle to reduce the pressing force of the friction clutch.

In the above power transfer device for the vehicle, the worm wheel may be a spur gear. The shaft of the motor may be disposed such that a rotational axis of the shaft is inclined at an angle equal to a pitch angle of the worm relative to a rotational plane that is orthogonal to a rotational axis of the worm wheel.

With this configuration, the operation efficiency of the worm speed-reduction gear mechanism in moving the worm wheel in the direction of the rotational axis thereof can be improved.

A second aspect of the present disclosure is a control method of a power transfer device. The power transfer device includes: a friction clutch configured to adjust a transmission torque to be transmitted from an input rotary member to an output rotary member; a motor; a worm speed-reduction gear mechanism including a worm that is provided on a shaft of the motor and a worm wheel that meshes with the worm; a conversion mechanism configured to generate a pressing force in the friction clutch by converting a rotary motion of the worm wheel into a linear motion; and an electronic control unit configured to control a rotation angle of the motor. The control method includes repeatedly executing, by the electronic control unit, rapid increase control and gradual reduction control when the friction clutch is to be maintained in a fully engaged state such that the input rotary member and the output rotary member rotate integrally. The rapid increase control is a control mode in which the rotation angle of the motor is increased to a first rotation angle at a first speed gradient. The first rotation angle is larger than a required rotation angle that is required to maintain the friction clutch in the fully engaged state. The gradual reduction control is a control mode in which the rotation angle of the motor having been increased by the rapid increase control is reduced to a second rotation angle at a second speed gradient. The second rotation angle is larger than or equal to the required rotation angle and smaller than the first rotation angle. The second speed gradient is smaller than the first speed gradient.

With this configuration, when the friction clutch is to be maintained in the fully engaged state such that the input rotary member and the output rotary member rotate integrally, the electronic control unit executes the gradual reduction control of gradually reducing the rotation angle of the motor to the second rotation angle, so that the motor current supplied to the motor is adjusted to a lower current value on an efficiency characteristic line of the pressing force generated in the friction clutch relative to the motor current supplied to the motor on the piston returning side. Thus, the average current value of the motor current supplied to the motor when the friction clutch is to be maintained in the fully engaged state is appropriately reduced, compared with if, for example, control is executed so as to keep a constant rotation angle of the motor when the friction clutch is to be maintained in the fully engaged state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a sectional view taken along line VI-VI in FIG. 2, showing the position of a cam engaging member coupled to a fork shaft when the fork shaft is in a high-gear position;

FIG. 6B is a sectional view taken along line VI-VI in FIG. 2, showing the position of the cam engaging member coupled to the fork shaft when the fork shaft is switching from the high-gear position to a low-gear position;

FIG. 6C is a sectional view taken along line VI-VI in FIG. 2, showing the position of the cam engaging member coupled to the fork shaft when the fork shaft is in the low-gear position;

DETAILED DESCRIPTION OF EMBODIMENTS

An embodiment of the present disclosure will be described below in detail with reference to the drawings. In the following embodiment, the drawings are simplified or deformed as appropriate, and thus the dimensional ratios, shapes, etc. of the parts are not necessarily precisely represented.

Figure 1:
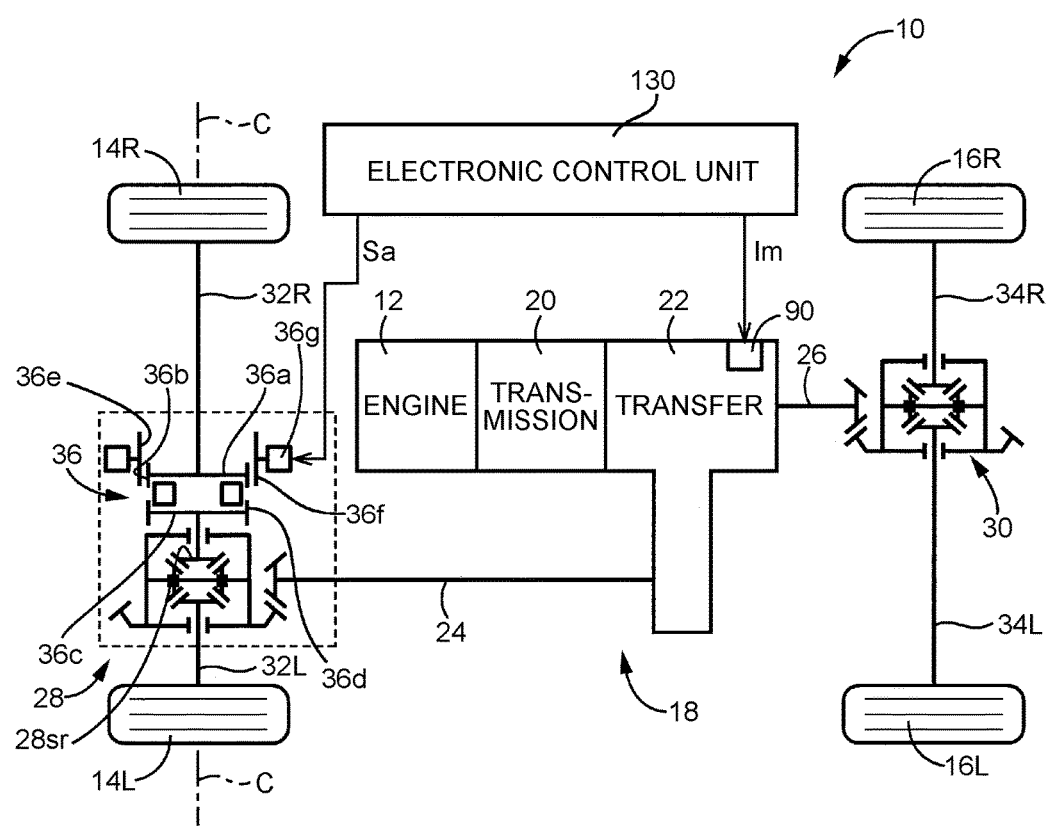
FIG. 1 is a view illustrating a schematic configuration of a vehicle to which the present disclosure is applied.

FIG. 1 is a view illustrating a schematic configuration of a vehicle 10 to which the present disclosure is applied, and is a view illustrating main parts of a control system for executing various controls in the vehicle 10. In FIG. 1, the vehicle 10 includes an engine 12 as a driving source, left and right front wheels 14L, 14R (to be referred to as front wheels 14 where no distinction is made therebetween), left and right rear wheels 16L, 16R (to be referred to as rear wheels 16 where no distinction is made therebetween), and a power transmission device 18 that transmits power from the engine 12 to each of the front wheels 14 and the rear wheels 16. The rear wheels 16 are main driving wheels that serve as driving wheels during both of a two-wheel-drive (2WD) travel and a four-wheel-drive (4WD) travel. The front wheels 14 are sub-driving wheels that serve as idler wheels during a 2WD travel and serve as driving wheels during a 4WD travel. The vehicle 10 is a four-wheel-drive vehicle based on a front-engine, rear-wheel-drive (FR) configuration.

The power transmission device 18 includes: a transmission 20 coupled to the engine 12; a four-wheel-drive vehicle transfer 22 that is a front-rear wheel power transfer device (vehicle power transfer device) coupled to the transmission 20; a front propeller shaft (power transmission member) 24 and a rear propeller shaft 26 each coupled to the transfer 22; a front-wheel differential gear device 28 coupled to the front propeller shaft 24; a rear-wheel differential gear device 30 coupled to the rear propeller shaft 26; left and right front-wheel axles 32L, 32R (to be referred to as front-wheel axles 32 where no distinction is made therebetween) coupled to the front-wheel differential gear device 28; and left and right rear-wheel axles 34L, 34R (to be referred to as rear-wheel axles 34 where no distinction is made therebetween) coupled to the rear-wheel differential gear device 30. In the power transmission device 18 thus configured, power from the engine 12 that has been transmitted to the transfer 22 through the transmission 20 is transmitted from the transfer 22 to the rear wheels 16, sequentially through the rear propeller shaft 26, the rear-wheel differential gear device 30, the rear-wheel axles 34, etc. that constitute a power transmission path on the side of the rear wheels 16. Part of the power from the engine 12 that is transmitted to the rear wheels 16 is selectively distributed by the transfer 22 to the front wheels 14, and is transmitted to the front wheels 14 sequentially through the front propeller shaft 24, the front-wheel differential gear device 28, the front-wheel axles 32, etc. that constitute a power transmission path on the side of the front wheels 14. The front propeller shaft 24 is installed in the power transmission path between the transfer 22 and the front wheels 14, and is a power transmission member that transmits, to the front wheels 14, power having been transmitted to a rear wheel-side output shaft 44, to be described later, of the transfer 22. The rear propeller shaft 26 is installed in the power transmission path between the transfer 22 and the rear wheels 16, and is a power transmission member that transmits, to the rear wheels 16, power having been transmitted to a drive gear 46, to be described later, of the transfer 22.

As shown in FIG. 1, a front-side clutch (on-off clutch) 36 that establishes and interrupts a power transmission path between a side gear 28sr of the front-wheel differential gear device 28 and the front wheel 14R is provided between the front-wheel differential gear device 28 and the front wheel 14R. The front-side clutch 36 includes: a first rotary member 36a provided integrally on the front-wheel axle 32R, first clutch teeth 36b formed on an outer circumference of the first rotary member 36a; a second rotary member 36c provided integrally on the side gear 28sr, second clutch teeth 36d formed on an outer circumference of the second rotary member 36c; a switching sleeve 36f having inner circumferential teeth 36e that can mesh with the first clutch teeth 36b and the second clutch teeth 36d and provided so as to be movable in the direction of a rotational axis C of the front-wheel axle 32R; and a switching actuator 36g that is caused by an electronic control unit (control unit) 130, to be described later, to drive the switching sleeve 36f in the direction of the rotational axis C. The front-side clutch 36 thus configured establishes and interrupts a power transmission path between the front propeller shaft 24 and the front wheels 14L, 14R as the switching sleeve 36f is switched by the switching actuator 36g between a meshing position at which the inner circumferential teeth 36e of the switching sleeve 36f mesh with the first clutch teeth 36b and the second clutch teeth 36d, and a non-meshing position at which the inner circumferential teeth 36e do not mesh with the second clutch teeth 36d. The front-side clutch 36 may further include a synchronization mechanism.

Figure 2:
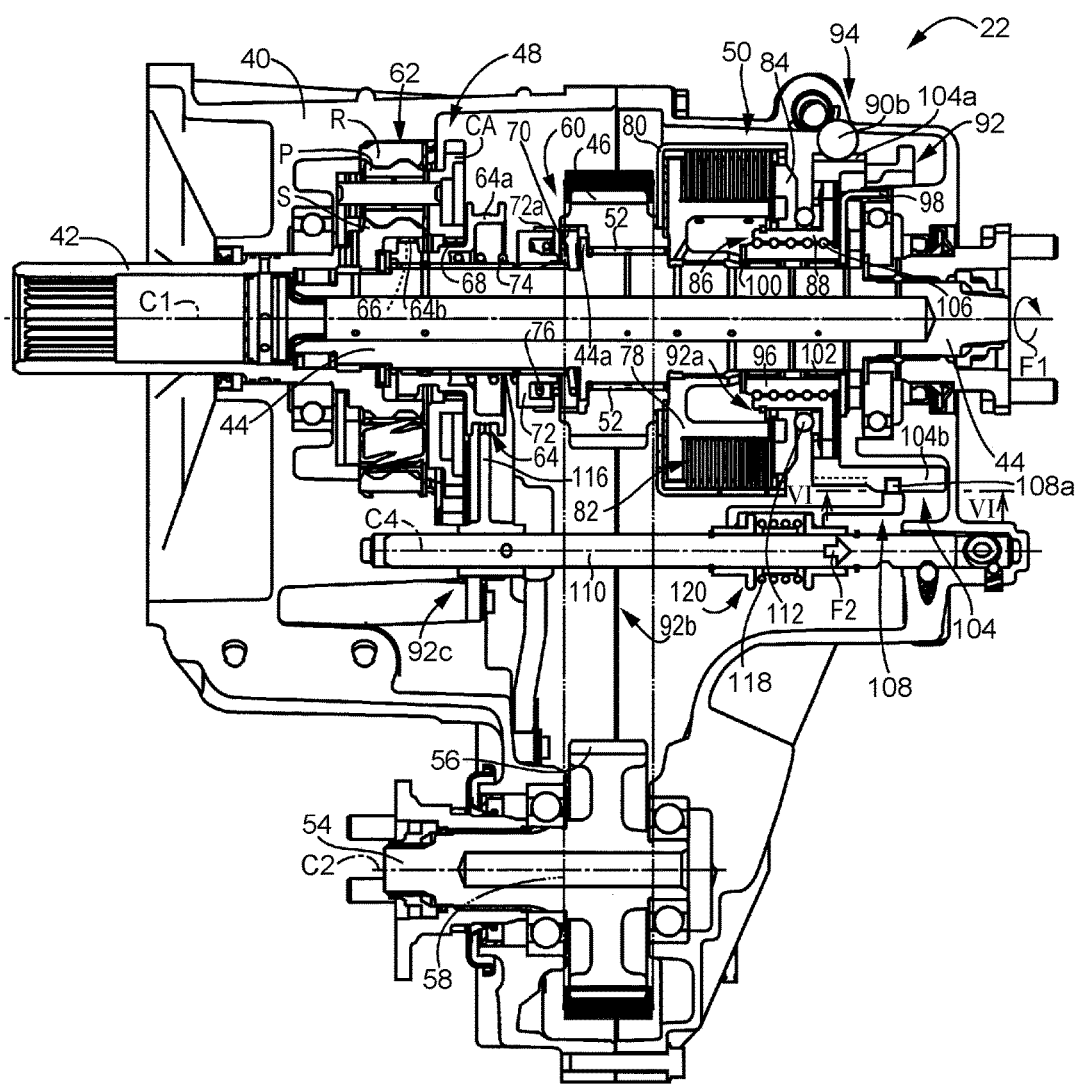
FIG. 2 is a sectional view illustrating a schematic configuration of a transfer of FIG. 1.
Figure 3:
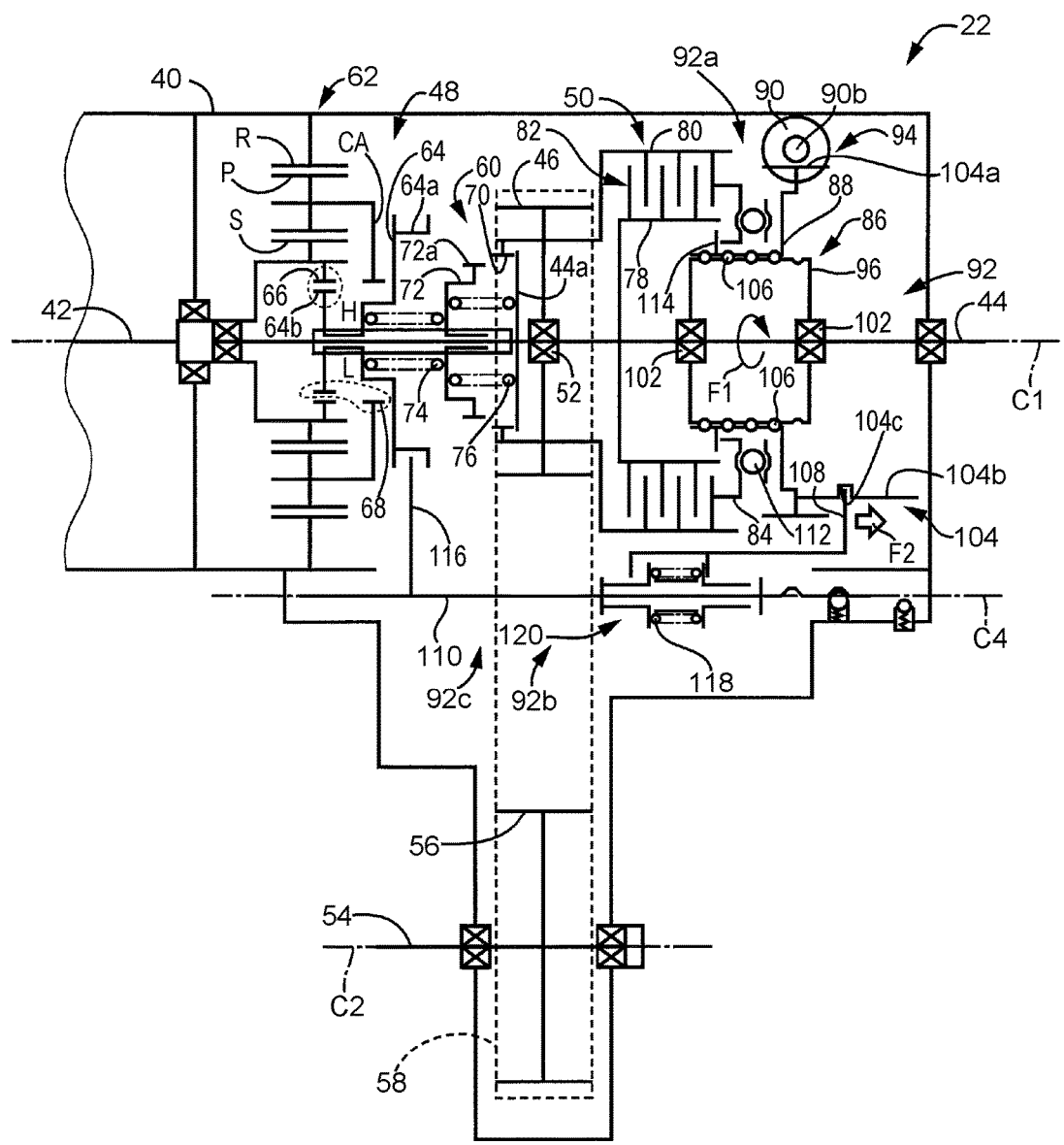
FIG. 3 is a skeleton diagram illustrating the schematic configuration of the transfer of FIG. 1.

FIG. 2 and FIG. 3 are views illustrating a schematic configuration of the transfer 22. FIG. 2 is a sectional view of the transfer 22, and FIG. 3 is a skeleton diagram of the transfer 22. As shown in FIG. 2 and FIG. 3, the transfer 22 includes a transfer case 40 as a non-rotary member. The transfer 22 includes, around a common first rotational axis C1: an input shaft 42 which is rotatably supported by the transfer case 40 and into which power from the engine 12 is input through the transmission 20; the rear wheel-side output shaft (input rotary member) 44 that transmits power from the engine 12 to the rear wheels 16 through the rear propeller shaft 26; a sprocket drive gear (output rotary member) 46 that transmits power to a destination different from that of the rear wheel-side output shaft 44; a high-low switching mechanism 48 as a sub-transmission that changes the speed of the rotation of the input shaft 42 and transmits the rotation to the rear wheel-side output shaft 44; and a front wheel-driving clutch 50 as a multiple-disc friction clutch that adjusts a transmission torque to be transmitted to the drive gear 46 as part of power of the rear wheel-side output shaft 44. The drive gear 46 is supported on the rear wheel-side output shaft 44 through a support bearing 52 so as to be rotatable relative to the rear wheel-side output shaft 44. The rear wheel-side output shaft 44 is coupled to the rear wheels 16 so as to be able to transmit power thereto, while the drive gear 46 is coupled to the front wheels 14 through the front-side clutch 36 so as to be able to transmit power to the front wheels 14.

As shown in FIG. 2 and FIG. 3, the transfer 22 includes, around a common second rotational axis C2 parallel to the first rotational axis C1, a front wheel-side output shaft 54 that is coupled to the front propeller shaft 24 so as to be able to transmit power thereto, and a sprocket driven gear 56 that is integrally provided on the front wheel-side output shaft 54. The transfer 22 further includes a front wheel-driving chain 58 that is wound across the drive gear 46 and the driven gear 56, and a 4WD lock mechanism 60 as a dog clutch that integrally couples together the rear wheel-side output shaft 44 and the drive gear 46.

The transfer 22 thus configured adjusts a transmission torque to be transmitted to the drive gear 46 by the front wheel-driving clutch 50, and transmits the power having been transmitted thereto from the transmission 20 to only the rear wheels 16 or distributes the power to the front wheels 14 as well. Moreover, the transfer 22 switches, by the 4WD lock mechanism 60, between a 4WD lock state in which a difference in rotation speed between the rear propeller shaft 26 and the front propeller shaft 24 is not permitted, and a 4WD unlock state in which a difference in rotation speed therebetween is permitted. Furthermore, the transfer 22 establishes one of a high speed-side gear stage H and a low speed-side gear stage L, and transmits a rotation from the transmission 20 to a rear stage after changing the speed of the rotation. Specifically, the transfer 22 transmits the rotation of the input shaft 42 to the rear wheel-side output shaft 44 through the high-low switching mechanism 48. In a state where the transmission torque transmitted through the front wheel-driving clutch 50 is zero and the 4WD lock mechanism 60 is disengaged, no power is transmitted from the rear wheel-side output shaft 44 to the front wheel-side output shaft 54, whereas in a state where a torque is transmitted through the front wheel-driving clutch 50 or the 4WD lock mechanism 60 is engaged, power is transmitted from the rear wheel-side output shaft 44 to the front wheel-side output shaft 54 through the drive gear 46, the front wheel-driving chain 58, and the driven gear 56.

Specifically, the high-low switching mechanism 48 includes a single-pinion planetary gear device 62 and a high-low sleeve 64. The planetary gear device 62 includes: a sun gear S that is coupled to the input shaft 42 so as to be unable to rotate around the first rotational axis C1; a ring gear R that is disposed substantially concentrically with the sun gear S and coupled to the transfer case 40 so as to be unable to rotate around the first rotational axis C1; and a carrier CA that supports a plurality of pinion gears P meshing with the sun gear S and the ring gear R so as to be rotatable and revolvable around the sun gear S. Thus, the sun gear S rotates at the same speed as the input shaft 42, while the carrier CA rotates at a lower speed than the input shaft 42. High-side gear teeth 66 are fixedly provided on an inner circumferential surface of the sun gear S, and low-side gear teeth 68 having the same diameter as the high-side gear teeth 66 are fixedly provided on the carrier CA. The high-side gear teeth 66 are inner circumferential spline teeth that output a rotation at the same speed as the rotation of the input shaft 42 and contribute to establishing the high speed-side gear stage H. The low-side gear teeth 68 are inner circumferential spine teeth that output a rotation at a lower speed than the high-side gear teeth 66 and contribute to establishing the low speed-side gear stage L. The high-low sleeve 64 is spline-fitted on the rear wheel-side output shaft 44 so as to be unable to rotate relative to the rear wheel-side output shaft 44 and movable in the direction of the first rotational axis C1 relative to the rear wheel-side output shaft 44. The high-low sleeve 64 includes a fork coupling portion 64a, and outer circumferential teeth 64b that are integrally provided adjacent to the fork coupling portion 64a, and that mesh with each of the high-side gear teeth 66 and the low-side gear teeth 68 as the high-low sleeve 64 moves in the direction of the first rotational axis C1 relative to the rear wheel-side output shaft 44. In the high-low switching mechanism 48, a rotation at the same speed as the rotation of the input shaft 42 is transmitted to the rear wheel-side output shaft 44 as the outer circumferential teeth 64b of the high-low sleeve 64 mesh with the high-side gear teeth 66, and a rotation at a lower speed than the rotation of the input shaft 42 is transmitted to the rear wheel-side output shaft 44 as the outer circumferential teeth 64b of the high-low sleeve 64 mesh with the low-side gear teeth 68.

The 4WD lock mechanism 60 includes lock teeth 70 that are fixedly provided on an inner circumferential surface of the drive gear 46, and a lock sleeve 72 which is spline-fitted on the rear wheel-side output shaft 44 so as to be movable in the direction of the first rotational axis C1 relative to the rear wheel-side output shaft 44 and unable to rotate relative to the rear wheel-side output shaft 44, and on an outer circumferential surface of which outer circumferential teeth 72a meshing with the lock teeth 70 as the lock sleeve 72 moves in the direction of the first rotational axis C1 are fixedly provided. When the 4WD lock mechanism 60 is in an engaged state with the outer circumferential teeth 72a of the lock sleeve 72 and the lock teeth 70 meshing with each other, the rear wheel-side output shaft 44 and the drive gear 46 are integrally rotated and thus the 4WD lock state is established in the transfer 22.

As shown in FIG. 2 and FIG. 3, the transfer 22 includes: a coil-shaped first spring 74 in a pre-compressed state that is provided between the high-low sleeve 64 and the lock sleeve 72, and butts against each of the high-low sleeve 64 and the lock sleeve 72 so as to urge the high-low sleeve 64 and the lock sleeve 72 in directions away from each other; and a coil-shaped second spring 76 in a pre-compressed state that is provided between the drive gear 46 and the lock sleeve 72, and butts against each of a protrusion 44a formed on the rear wheel-side output shaft 44 and the lock sleeve 72 so as to urge the lock sleeve 72 in a direction away from the lock teeth 70. The urging force of the first spring 74 is set to be larger than the urging force of the second spring 76. Thus, when the high-low sleeve 64 is moved to a position at which the outer circumferential teeth 64b of the high-low sleeve 64 and the high-side gear teeth 66 mesh with each other, the high-low sleeve 64 is moved by the urging force of the second spring 76 to a position at which the outer circumferential teeth 72a of the lock sleeve 72 do not mesh with the lock teeth 70. When the high-low sleeve 64 is moved against the urging forces of the first spring 74 and the second spring 76 to a position at which the outer circumferential teeth 64b of the high-low sleeve 64 and the low-side gear teeth 68 mesh with each other, the lock sleeve 72 is moved by the urging force of the first spring 74 to a position at which the outer circumferential teeth 72a of the lock sleeve 72 mesh with the lock teeth 70.

Figure 4:
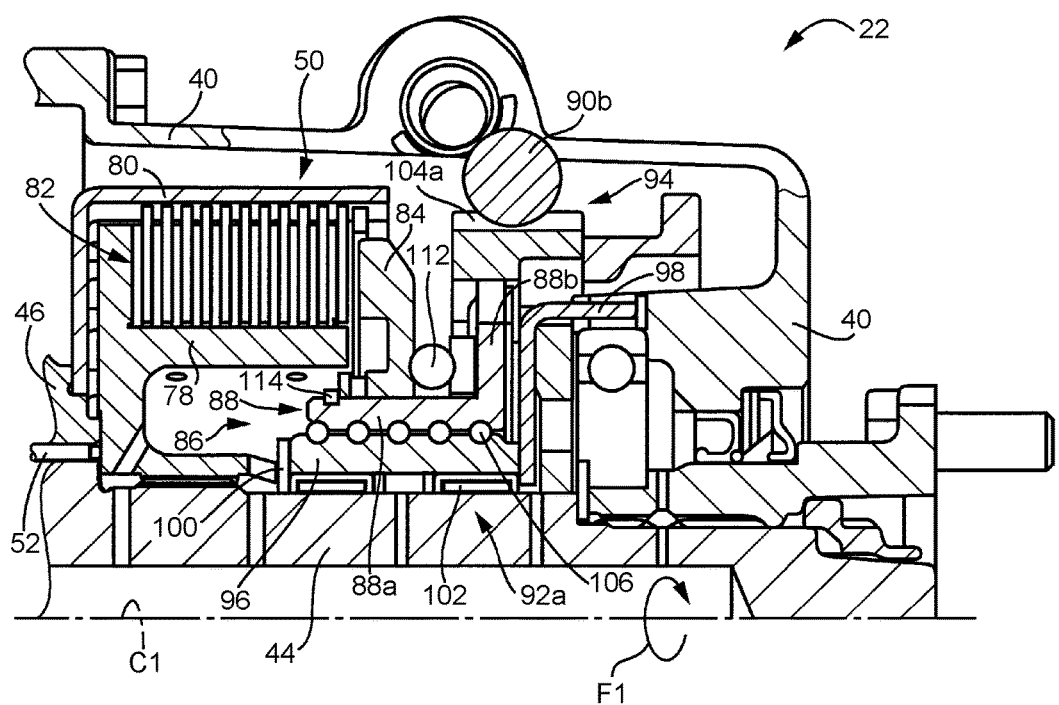
FIG. 4 is an enlarged view of FIG. 2, illustrating the configuration of a front wheel-driving clutch, a worm gear, a screw mechanism, etc. provided in the transfer of FIG. 2.

As shown in FIG. 4, the front wheel-driving clutch 50 is a multiple-disc friction clutch including: a clutch hub 78 that is coupled to the rear wheel-side output shaft 44 so as to be unable to rotate relative to the rear wheel-side output shaft 44; a clutch drum 80 that is coupled to the drive gear 46 so as to be unable to rotate relative to the drive gear 46; a frictional engagement element 82 that is inserted between the clutch hub 78 and the clutch drum 80 and selectively connects and disconnects the clutch hub 78 and the clutch drum 80 to and from each other; and a piston 84 that presses the frictional engagement element 82. The front wheel-driving clutch 50 reaches a disengaged state, when the piston 84 is moved toward a non-pressing side (the right side in FIG. 4) that is the side away from the drive gear 46 and thus the piston 84 does not butt against nor press the frictional engagement element 82. Conversely, when the piston 84 is moved toward a pressing side (the left side in FIG. 4) that is the side toward the drive gear 46 and thus the piston 84 butts against and presses the frictional engagement element 82, the pressing force (clutch pressing force F (N)) with which the piston 84 presses the frictional engagement element 82 is adjusted through the amount of movement (stroke) of a nut member 88 of a screw mechanism (conversion mechanism) 86, to be described later, that presses the piston 84 against the frictional engagement element 82, so that the front wheel-driving clutch 50 reaches a slipping state or a fully engaged state. In short, the front wheel-driving clutch 50 reaches the slipping state or the fully engaged state as the transmission torque thereof is adjusted.

When the front wheel-driving clutch 50 is in the disengaged state, and the 4WD lock mechanism 60 is in the disengaged state with the outer circumferential teeth 72a of the lock sleeve 72 and the lock teeth 70 out of mesh with each other, the power transmission path between the rear wheel-side output shaft 44 and the drive gear 46 is interrupted, so that the transfer 22 transmits power having been transmitted thereto from the engine 12 through the transmission 20, to only the rear wheels 16. On the other hand, when the front wheel-driving clutch 50 is in the slipping state or the fully engaged state, the transfer 22 distributes power having been transmitted thereto from the engine 12 through the transmission 20, to each of the front wheels 14 and the rear wheels 16. When the front wheel-driving clutch 50 is in the slipping state, a difference in rotation speed between the rear wheel-side output shaft 44 and the drive gear 46 is permitted, and thus a differential rotation state (4WD unlock state) is established in the transfer 22. On the other hand, when the front wheel-driving clutch 50 is in the fully engaged state, the rear wheel-side output shaft 44 and the drive gear 46 are integrally rotated, and thus the 4WD lock state is established in the transfer 22. As the transmission torque is controlled, the front wheel-driving clutch 50 can continuously change the torque distribution ratio between the front wheels 14 and the rear wheels 16 from 0:100 to 50:50.

The transfer 22 further includes: an electric motor (motor) (see FIG. 5) 90 that is a driving device that drives the high-low switching mechanism 48, the front wheel-driving clutch 50, and the 4WD lock mechanism 60; the screw mechanism 86 that generates, through the piston 84, the clutch pressing force F (N) with which the piston 84 presses the frictional engagement element 82 in the front wheel-driving clutch 50, by converting a rotary motion of a shaft 90a provided in the electric motor 90 into a linear motion of the nut member 88 in the direction of the first rotational axis C1 and a rotary motion of the nut member 88 around the first rotational axis C1; and a transmission mechanism 92 that transmits a linear motion and a turning motion of the nut member 88 of the screw mechanism 86 to each of the high-low switching mechanism 48, the front wheel-driving clutch 50, and the 4WD lock mechanism 60.

As shown in FIG. 4, the screw mechanism 86 includes: the nut member 88 as a rotary member that is disposed around the first rotational axis C1, and is indirectly coupled to the shaft 90a of the electric motor 90 through a worm gear (worm speed-reduction gear mechanism) 94 of the transfer 22 so as to be able to transmit power to the shaft 90a; a screw shaft member 96 that engages with the nut member 88; and a coupling member 98 that couples an end of the screw shaft member 96 on a rear side (the side of the rear propeller shaft 26) and the transfer case 40 that is a non-rotary member to each other to allow the screw shaft member 96 to be installed on the rear wheel-side output shaft 44 so as to be unable to move in the direction of the first rotational axis C1 and unable to turn around the first rotational axis C1 relative to the transfer case 40. As shown in FIG. 4, the screw shaft member 96 is prevented from moving in the direction of the first rotational axis C1, as an end of the screw shaft member 96 on a front side (the end of the screw shaft member 96 on the opposite side from the rear propeller shaft 26 (from the rear side)) butts against the clutch hub 78 through an annular member 100, and moreover the end of the screw shaft member 96 on the rear side butts against the coupling member 98. A needle bearing 102 is interposed between the screw shaft member 96 and the rear wheel-side output shaft 44, and the screw shaft member 96 is supported on the rear wheel-side output shaft 44 so as to be rotatable relative to the rear wheel-side output shaft 44.

In the screw mechanism 86 thus configured, the nut member 88 is driven to rotate by the electric motor 90 through the worm gear 94 so as to move in the direction of the first rotational axis C1. In this embodiment, as shown in FIG. 2 and FIG. 3, when the nut member 88 is turned by the electric motor 90 around the first rotational axis C1 in the direction of the arrow F1, the nut member 88 moves away from the front wheel-driving clutch 50 in the direction of the first rotational axis C1 (moves in the direction of the arrow F2) by the screw action between the nut member 88 and the screw shaft member 96. When the nut member 88 is turned by the electric motor 90 around the first rotational axis C1 in the opposite direction from the direction of the arrow F1, the nut member 88 moves in the opposite direction from the direction of the arrow F2 by the screw action between the nut member 88 and the screw shaft member 96.

Figure 5:
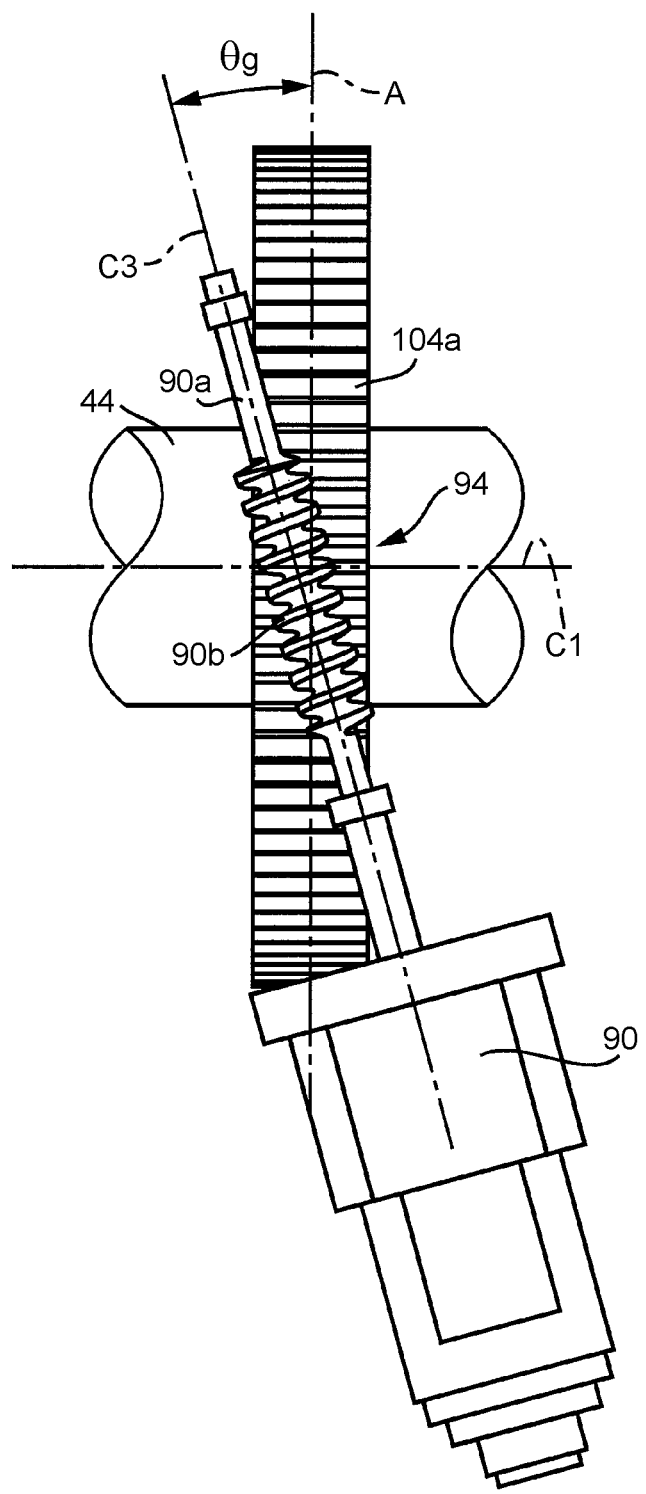
FIG. 5 is a view illustrating the worm gear and an electric motor provided in the transfer of FIG. 4.

As shown in FIG. 5, the worm gear 94 is a gear pair including a worm 90b that is integrally formed on the shaft 90a of the electric motor 90, and a worm wheel 104a that is formed integrally on a drum cam 104, to be described later, and meshes with the worm 90b. The nut member 88 includes a cylindrical internal thread portion 88a that engages with the screw shaft member 96 through a plurality of balls 106, and a flange portion 88b that protrudes from an end of the cylindrical internal thread portion 88a on the rear side, i.e., the side of the rear propeller shaft 26, toward an outer circumferential side, and the worm wheel 104a is integrally fixed on an outer circumference of the flange portion 88b of the nut member 88. On an outer circumference of the internal thread portion 88a of the nut member 88, the piston 84 of the front wheel-driving clutch 50 is supported so as to be rotatable around the first rotational axis C1 relative to the internal thread portion 88a and unable to move in the direction of the first rotational axis C1 relative to the internal thread portion 88a. Thus, the screw mechanism 86 is a power conversion mechanism that generates the clutch pressing force F (N) in the front wheel-driving clutch 50 by converting a rotary motion of the nut member 88 around the first rotational axis C1 into a linear motion in the direction of the first rotational axis C1 by the screw action between the nut member 88 and the screw shaft member 96, and pressing the frictional engagement element 82 of the front wheel-driving clutch 50 through the piston 84 provided on the nut member 88.

As the electric motor 90 is driven to rotate, the worm wheel 104a formed on the drum cam 104 that is fixedly provided on the nut member 88 moves in the direction of the first rotational axis C1. Here, the width of the worm wheel 104a in the direction of the first rotational axis C1 is set to be larger than the width in the direction of the first rotational axis C1 of the worm 90b formed on the shaft 90a of the electric motor 90 fixed to the transfer case 40, such that, even when the worm wheel 104a moves in the direction of the first rotational axis C1, the worm wheel 104a and the worm 90b formed on the shaft 90a remain in mesh with each other. The worm wheel 104a is a spur gear of which the flank line of outer circumferential teeth is parallel to the first rotational axis C1 around which the worm wheel 104a rotates. As shown in FIG. 5, the shaft 90a of the electric motor 90 is disposed such that a third rotational axis (first rotational axis) C3 around which the shaft 90a rotates is inclined at an angle equal to a pitch angle θg of the worm 90b relative to a rotational plane A orthogonal to the first rotational axis (second rotational axis) C1 around which the worm wheel 104a rotates.

The transmission mechanism 92 includes: a first transmission mechanism 92a that transmits a linear motion of the nut member 88 in the screw mechanism 86 in the direction of the first rotational axis C1 to the front wheel-driving clutch 50; and a second transmission mechanism 92b that transmits to the high-low switching mechanism 48 a linear motion, in the direction of the first rotational axis C1, i.e., the direction of a fourth rotational axis C4, of a leading end 108a (see FIG. 6A, FIG. 6B, and FIG. 6C) of a cam engaging member 108, to be described later, that is engaged in a cam groove 104c (see FIG. 6A, FIG. 6B, and FIG. 6C) formed in the drum cam 104. The fourth rotational axis C4 is an axis parallel to the first rotational axis C1.

As shown in FIG. 2 and FIG. 3, the drum cam 104 includes the annular worm wheel 104a, a projecting portion 104b that projects from an end of the annular worm wheel 104a on the side of the fork shaft 110 toward the rear propeller shaft 26, and the cam groove 104c formed in an outer circumference of the projecting portion 104b. The projecting portion 104b has a shape, for example, corresponding to a portion of a cylinder, and is formed by projecting a circumferential portion of the worm wheel 104a toward the rear propeller shaft 26.

As shown in FIG. 6A, FIG. 6B, and FIG. 6C, the cam groove 104c formed in the outer circumference of the drum cam 104 has: an inclined cam groove 104d extending in a direction inclined relative to the first rotational axis C1; a first cam groove 104e as a switching cam groove that is formed at an end of the inclined cam groove 104d on the side of the screw mechanism 86 and extends in a direction orthogonal to the first rotational axis C1; and a second cam groove 104f that is formed at an end of the inclined cam groove 104d on the opposite side from the screw mechanism 86 and extends in a direction perpendicular to the first rotational axis C1. According to the drum cam 104 thus configured, for example, when, in a state where the leading end 108a of the cam engaging member 108 is disposed in the first cam groove 104e of the cam groove 104c of the drum cam 104 as shown in FIG. 6A, the nut member 88 is turned by the electric motor 90 around the first rotational axis C1 in the direction of the arrow F1 and the drum cam 104 is turned around the first rotational axis C1 in the direction of the arrow F1, the leading end 108a of the cam engaging member 108 is moved along the inclined cam groove 104d of the drum cam 104 in the direction of the arrow F2, in an amount of movement D larger than the amount of movement that the nut member 88 moves in the direction of the arrow F2 by the screw action between the nut member 88 and the screw shaft member 96. Thus, the leading end 108a is moved in the direction of the fourth rotational axis C4 of the fork shaft 110. In other words, when, in the state shown in FIG. 6A, the nut member 88 is turned by the electric motor 90 around the first rotational axis C1 in the direction of the arrow F1, the cam engaging member 108 is moved relative to the drum cam 104 in the direction of the fourth rotational axis C4 of the fork shaft 110 due to the inclined cam groove 104d, in the amount of movement D larger than the amount of movement that the nut member 88 moves in the direction of the arrow F2 by the screw action between the nut member 88 and the screw shaft member 96.

For example, when, in a state where the leading end 108a of the cam engaging member 108 is disposed in the second cam groove 104f of the cam groove 104c of the drum cam 104 as shown in FIG. 6C, the nut member 88 is turned by the electric motor 90 around the first rotational axis C1 in the opposite direction from the direction of the arrow F1 and the drum cam 104 is turned around the first rotational axis C1 in the opposite direction from the direction of the arrow F1, the leading end 108a of the cam engaging member 108 is moved along the inclined cam groove 104d of the drum cam 104 in the opposite direction from the direction of the arrow F2, in the amount of movement D larger than the amount of movement that the nut member 88 moves in the opposite direction from the direction of the arrow F2 by the screw action between the nut member 88 and the screw shaft member 96. In other words, when the electric motor 90 is driven to rotate and the drum cam 104 is turned around the first rotational axis C1 through the nut member 88, the cam engaging member 108 engaged in the cam groove 104c formed in the drum cam 104 is moved in the direction of the first rotational axis C1 due to the cam groove 104c. Thus, the cam engaging member 108 is moved in the direction of the fourth rotational axis C4 of the fork shaft 110. In other words, when the electric motor 90 is driven to rotate and the drum cam 104 is turned around the first rotational axis C1 through the nut member 88, the cam engaging member 108 is moved in the direction of the fourth rotational axis C4 of the fork shaft 110 relative to the drum cam 104. The one-dot dashed circles shown in FIG. 6B and FIG. 6C indicate the position of the leading end 108a of the cam engaging member 108 of FIG. 6A. For example, when, in the state shown in FIG. 6A, the nut member 88 is turned by the electric motor 90 around the first rotational axis C1 in the opposite direction from the direction of the arrow F1 and the drum cam 104 is turned around the first rotational axis C1 in the opposite direction from the direction of the arrow F1, the cam engaging member 108 is moved along the first cam groove 104e without being moved in the direction of the fourth rotational axis C4 of the fork shaft 110. Thus, in the state where the cam engaging member 108 is engaged in the first cam groove 104e, the cam engaging member 108 is prevented by the first cam groove 104e from moving in the direction of the fourth rotational axis C4 of the fork shaft 110, even when the nut member 88 turns around the first rotational axis C1 in the opposite direction from the direction of the arrow F1.

As shown in FIG. 4, the first transmission mechanism 92a includes a thrust bearing 112 that is interposed between the piston 84 and the flange portion 88b of the nut member 88, and a stopper member 114 that prevents the piston 84 from moving toward the frictional engagement element 82 relative to the nut member 88. The piston 84 is coupled to the nut member 88 through the thrust bearing 112 and the stopper member 114 so as to be unable to move in the direction of the first rotational axis C1 relative to the nut member 88 and rotatable around the first rotational axis C1 relative to the nut member 88. Thus, a linear motion of the nut member 88 in the screw mechanism 86 is transmitted to the piston 84 of the front wheel-driving clutch 50 through the first transmission mechanism 92a.

As shown in FIG. 2 and FIG. 3, the second transmission mechanism 92b includes: the fork shaft 110 that is supported so as to be movable inside the transfer case 40 in the direction of the fourth rotational axis C4; a fork 116 that is fixedly provided on the fork shaft 110 and coupled to the high-low sleeve 64; and a standby mechanism 120 that transmits a motion of the cam engaging member 108 in the direction of the fourth rotational axis C4 to the fork shaft 110 through a spring member 118. The standby mechanism 120 is provided on the cam engaging member 108. The second transmission mechanism 92b transmits a motion of the cam engaging member 108 in the direction of the fourth rotational axis C4 to the high-low sleeve 64 of the high-low switching mechanism 48 through the standby mechanism 120, the fork shaft 110, and the fork 116. Thus, for example, when, in the state shown in FIG. 6A, the cam engaging member 108 is moved in the direction of the arrow F2 relative to the drum cam 104, the high-low sleeve 64 is moved toward the drive gear 46. In other words, the high-low sleeve 64 is moved to the position at which the outer circumferential teeth 64b thereof mesh with the low-side gear teeth 68. For example, when, in the state shown in FIG. 6C, the cam engaging member 108 is moved in the opposite direction from the direction of the arrow F2, the high-low sleeve 64 is moved away from the drive gear 46. In other words, the high-low sleeve 64 is moved to the position at which the outer circumferential teeth 64b thereof mesh with the high-side gear teeth 66.

The transmission mechanism 92 further includes a third transmission mechanism 92c that transmits a linear motion of the cam engaging member 108 in the direction of the fourth rotational axis C4 to the 4WD lock mechanism 60. Like the second transmission mechanism 92b, the third transmission mechanism 92c includes a fork shaft 110, a fork 116, and a standby mechanism 120, and further includes a high-low sleeve 64 coupled to the fork 116, a first spring 74 installed in a compressed state between the high-low sleeve 64 and the lock sleeve 72, and a second spring 76 installed in a compressed state between the lock sleeve 72 and the protrusion 44a of the rear wheel-side output shaft 44.

In the third transmission mechanism 92c, when, in the state shown in FIG. 6A, the cam engaging member 108 is moved in the direction of the arrow F2 relative to the drum cam 104 and the high-low sleeve 64 is moved to the position at which the outer circumferential teeth 64b thereof mesh with the low-side gear teeth 68 as described above, the lock sleeve 72 is moved by the urging force of the first spring 74 toward the drive gear 46. As a result, the outer circumferential teeth 72a of the lock sleeve 72 mesh with the lock teeth 70 of the drive gear 46. When, in the state where the outer circumferential teeth 64b of the high-low sleeve 64 are in mesh with the low-side gear teeth 68, the cam engaging member 108 is moved in the opposite direction from the direction of the arrow F2 and the high-low sleeve 64 is moved to the position at which the outer circumferential teeth 64b thereof mesh with the high-side gear teeth 66, the lock sleeve 72 is moved away from the drive gear 46 by the urging force of the second spring 76. As a result, the outer circumferential teeth 72a of the lock sleeve 72 come out of mesh with the lock teeth 70 of the drive gear 46.

The outer circumferential teeth 72a of the lock sleeve 72 mesh with the lock teeth 70 at the position at which the fork shaft 110 allows the outer circumferential teeth 64b of the high-low sleeve 64 to mesh with the low-side gear teeth 68 (this position will be hereinafter referred to as a low-gear position). The frictional engagement element 82 of the front wheel-driving clutch 50 is pressed by the piston 84 at the position at which the fork shaft 110 allows the outer circumferential teeth 64b of the high-low sleeve 64 to mesh with the high-side gear teeth 66 (this position will be hereinafter referred to as a high-gear position), but is not pressed by the piston 84 at the low-gear position of the fork shaft 110. Of FIG. 6A, FIG. 6B, and FIG. 6C, FIG. 6A is a view showing the position of the cam engaging member 108 when the fork shaft 110 is in the high-gear position; FIG. 6C is a view showing the position of the cam engaging member 108 when the fork shaft 110 is in the low-gear position; and FIG. 6B is a view showing the position of the cam engaging member 108 when the fork shaft 110 is switching from the high-gear position to the low-gear position. For example, when, in the state shown in FIG. 6A, the drum cam 104 is turned by the electric motor 90 in the opposite direction from the direction of the arrow F1, the piston 84 of the front wheel-driving clutch 50 is moved from a position at which the piston 84 is not pressed against the frictional engagement element 82 to a position at which the piston 84 is pressed against the frictional engagement element 82, while the cam engaging member 108 is not moved in the direction of the fourth rotational axis C4 of the fork shaft 110 due to the first cam groove 104e and the fork shaft 110 remains in the high-gear position.

In the vehicle 10 configured as has been described above, a motor rotation angle (rotation angle) θm (deg) of the shaft 90a of the electric motor 90 is controlled by the electronic control unit (control unit) 130 to be described later, and thereby the amount of movement (stroke) of the piston 84 in the direction of the first rotational axis C1 and the amount of movement (stroke) of the fork shaft 110 in the direction of the fourth rotational axis C4 are controlled. In other words, the position to which the piston 84 moves in the direction of the first rotational axis C1 and the position to which the fork shaft 110 moves in the direction of the fourth rotational axis C4 are controlled.

For example, when the motor rotation angle θm of the electric motor 90 is controlled by the electronic control unit 130 such that the fork shaft 110 moves to the high-gear position and the piston 84 moves to the position at which the piston 84 does not butt against the frictional engagement element 82 (i.e., the piston 84 moves to an H2 position), the front wheel-driving clutch 50 is disengaged while the high speed-side gear stage H is established in the high-low switching mechanism 48, so that the vehicle 10 reaches a two-wheel-drive state in which driving power is transmitted from the engine 12 to only the rear wheels 16. In the two-wheel-drive state in which the front wheel-driving clutch 50 is disengaged, the front-side clutch 36 is disengaged by the electronic control unit 130, so that a rotation is transmitted neither from the engine 12 nor from the front wheels 14 to the rotary elements (drive gear 46, front wheel-driving chain 58, driven gear 56, front wheel-side output shaft 54, front propeller shaft 24, front-wheel differential gear device 28, etc.) constituting the power transmission path from the drive gear 46 to the front-wheel differential gear device 28.

When the motor rotation angle θm of the electric motor 90 is controlled by the electronic control unit 130 such that the fork shaft 110 moves to the high-gear position and the piston 84 moves to the position at which the piston 84 butts against the frictional engagement element 82 (i.e., the piston 84 moves to an H4 position), the front wheel-driving clutch 50 is engaged (slipping engagement or full engagement) while the high speed-side gear stage H is established in the high-low switching mechanism 48, so that the vehicle 10 reaches a four-wheel-drive state in which driving power is transmitted from the engine 12 to both the front wheels 14 and the rear wheels 16. When, in the four-wheel-drive state in which the front wheel-driving clutch 50 is engaged, the motor rotation angle θm of the electric motor 90 is controlled by the electronic control unit 130 such that the piston 84 moves to an H4L position so as to maintain the front wheel-driving clutch 50 in the fully engaged state, the vehicle 10 reaches the 4WD lock state in which the torque distribution ratio between the front wheels 14 and the rear wheels 16 is 50:50.

For example, when the motor rotation angle θm of the electric motor 90 is controlled by the electronic control unit 130 such that the fork shaft 110 moves to the low-gear position and the piston 84 moves to an L4 position, the 4WD lock mechanism 60 is engaged while the low speed-side gear stage L is established in the high-low switching mechanism 48, so that the vehicle 10 reaches the 4WD lock state in which the torque distribution ratio between the front wheels 14 and the rear wheels 16 is 50:50.

Figure 7:
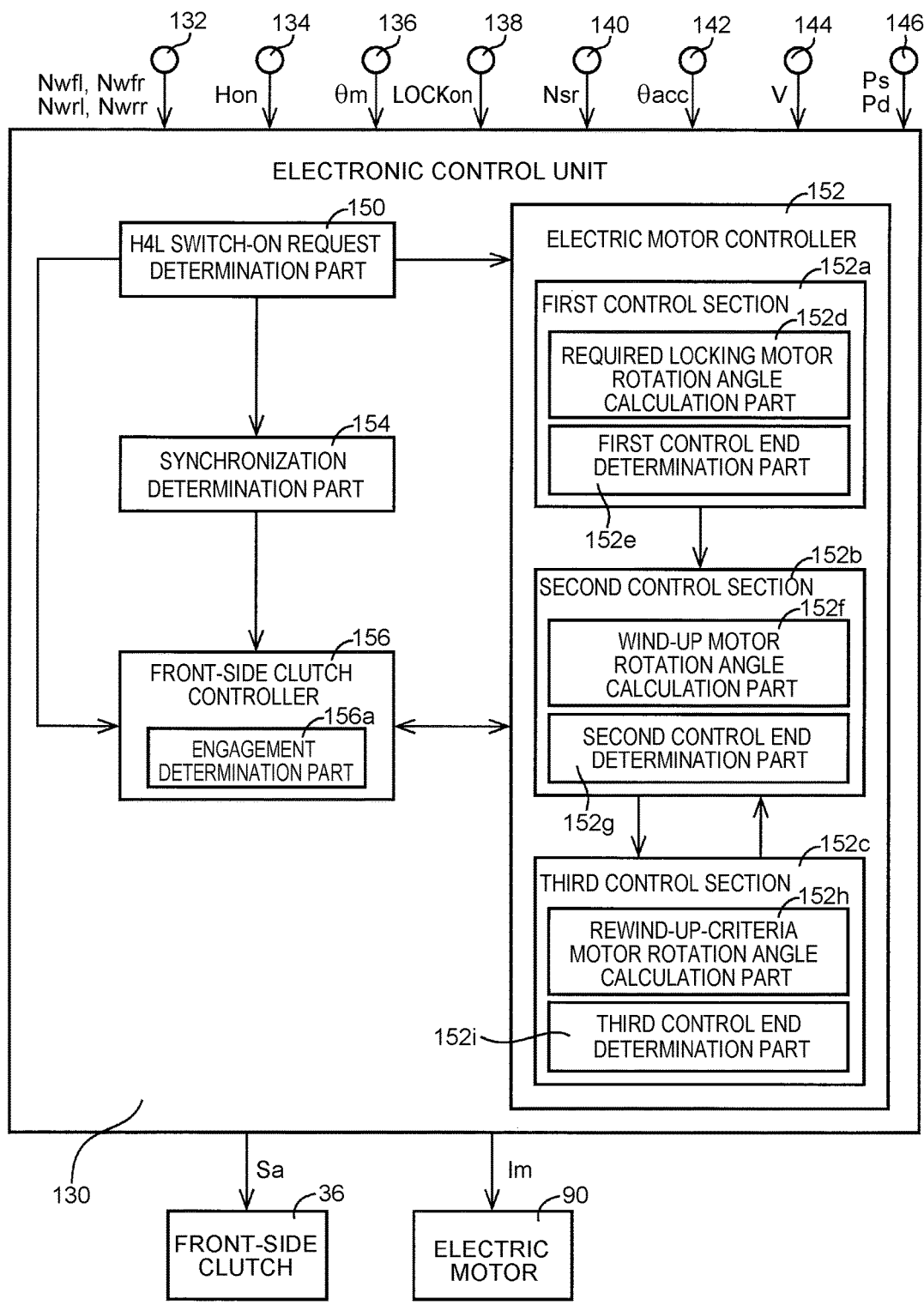
FIG. 7 is a functional block diagram illustrating a main part of control functions of an electronic control unit that is provided in the vehicle of FIG. 1.

Various signals from sensors, switches, etc. as shown in FIG. 7 are supplied to the electronic control unit 130 provided in the vehicle 10 as shown in FIG. 1. For example, the following signals are input into the electronic control unit 130: signals indicating rotation speeds Nfl, Nfr, Nrl, Nrr (rpm) of the front wheels 14L, 14R and the rear wheels 16L, 16R that are detected by a wheel speed sensor 132; a high-gear request signal Hon that is a signal, for example, indicating that a high-gear selection switch 134 used to select the high speed-side gear stage H is operated by a driver and that is detected by the high-gear selection switch 134; a signal indicating the motor rotation angle θm (deg) of the shaft 90a of the electric motor 90 that is detected by an electric motor rotation angle sensor 136; a 4WD lock request signal LOCKon that is a signal, for example, indicating that a 4WD lock selection switch 138 used to prevent the rear wheel-side output shaft 44 and the drive gear 46 from rotating at different speeds (to allow the rear wheel-side output shaft 44 and the drive gear 46 to rotate integrally) is operated by the driver; a signal indicating a rotation speed Nsr (rpm) of the side gear 28sr that is detected by a side gear rotation speed sensor 140; a signal indicating a throttle valve opening degree θacc (%) that is detected by a throttle valve opening degree sensor 142; a signal indicating a vehicle speed V (km/h) that is detected by a vehicle speed sensor 144; and signals indicating the position of the switching sleeve 36*f* that are detected by a position sensor 146, namely a signal Ps indicating that the switching sleeve 36*f* is at the meshing position and a signal Pd indicating that the switching sleeve 36*f* is at the non-meshing position.

Various output signals are supplied from the electronic control unit 130 to the devices provided in the vehicle 10. For example, an actuator driving command signal Sa that is supplied to the switching actuator 36*g* to switch the switching sleeve 36*f* between the meshing position and the non-meshing position, and a motor current Im (A) that is supplied to the electric motor 90 to control the motor rotation angle θm (deg) of the shaft 90*a* of the electric motor 90, are supplied from the electronic control unit 130 to the relevant parts.

An H4L switch-on request determination part 150 shown in FIG. 7 determines whether or not there is a request for switching the position of the piston 84 to the H4L position such that the high speed-side gear stage H is established in the high-low switching mechanism 48 and that the torque distribution ratio between the front wheels 14 and the rear wheels 16 becomes 50:50. For example, when the high-gear selection switch 134 and the 4WD lock selection switch 138 are operated by the driver, the H4L switch-on request determination part 150 determines that switching of the position of the piston 84 to the H4L position is requested.

An electric motor controller (controller) 152 is provided with a first control section 152*a*, a second control section 152*b*, and a third control section 152*c*. The electric motor controller 152 controls the position of the piston 84 in the direction of the first rotational axis C1 by controlling the motor rotation angle θm (deg) of the shaft 90*a* of the electric motor 90. Moreover, when the H4L switch-on request determination part 150 determines that switching of the position of the piston 84 to the H4L position is requested, the electric motor controller 152 controls the motor rotation angle θm (deg) of the shaft 90*a* of the electric motor 90 such that the piston 84 moves to the position at which the piston 84 butts against (comes in contact with) the frictional engagement element 82. For example, when the vehicle 10 is in the two-wheel-drive state and the piston 84 is moved by the electric motor controller 152 to the position at which the piston 84 butts against (comes in contact with) the frictional engagement element 82, part of power having been transmitted from the engine 12 to the rear wheel-side output shaft 44 is transmitted to the front propeller shaft 24 through the front wheel-driving clutch 50, and the rotation speed of the second rotary member 36*c* of the front-side clutch 36 that is coupled to the front propeller shaft 24 so as to be able to transmit power thereto rises until reaching the rotation speed of the first rotary member 36*a* coupled to the rear wheel 16R.

When the H4L switch-on request determination part 150 determines that switching of the position of the piston 84 to the H4L position is requested, a synchronization determination part 154 determines whether or not the rotation speed of the second rotary member 36*c* has synchronized with the rotation speed of the first rotary member 36*a* in the front-side clutch 36. For example, when the difference between the rotation speed Nfr (rpm) of the front wheel 14R detected by the wheel speed sensor 132 and the rotation speed Nsr (rpm) of the side gear 28*sr* detected by the side gear rotation speed sensor 140 (Nfr−Nsr) decreases to or below a predetermined value, the synchronization determination part 154 determines that the rotation speed of the second rotary member 36*c* has synchronized with the rotation speed of the first rotary member 36*a*.

When the H4L switch-on request determination part 150 determines that switching of the position of the piston 84 to the H4L position is requested, and moreover the synchronization determination part 154 determines that the rotation speed of the second rotary member 36*c* and the rotation speed of the first rotary member 36*a* have synchronized with each other, a front-side clutch controller 156 supplies the actuator driving command signal Sa to the switching actuator 36*g* to switch the position of the switching sleeve 36*f* from the non-meshing position to the meshing position.

When the front-side clutch controller 156 supplies the actuator driving command signal Sa to the switching actuator 36*g* to switch the position of the switching sleeve 36*f* from the non-meshing position to the meshing position, an engagement determination part 156*a* provided in the front-side clutch controller 156 determines whether or not the front-side clutch 36 has been engaged. For example, when the position sensor 146 detects that the switching sleeve 36*f* has been switched to the meshing position, the engagement determination part 156*a* determines that the front-side clutch 36 has been engaged.

When the H4L switch-on request determination part 150 determines that switching of the position of the piston 84 to the H4L position is requested, and moreover the engagement determination part 156*a* determines that the front-side clutch 36 has been engaged, the first control section 152*a* provided in the electric motor controller 152 executes first control of controlling the motor rotation angle θm (deg) of the shaft 90*a* of the electric motor 90 to a required locking motor rotation angle (required rotation angle) α (deg) that is calculated by a required locking motor rotation angle calculation part 152*d* to be described later. The first control is a control mode in which the motor rotation angle θm (deg) is increased to the required locking motor rotation angle α and the piston 84 is pressed against the frictional engagement element 82 to generate the clutch pressing force F (N) of the front wheel-driving clutch 50 such that the front wheel-driving clutch 50 reaches the fully engaged state.

When the H4L switch-on request determination part 150 determines that switching of the position of the piston 84 to the H4L position is requested, and moreover the engagement determination part 156*a* determines that the front-side clutch 36 has been engaged, the required locking motor rotation angle calculation part 152*d* calculates the required locking motor rotation angle α that is required for the front wheel-driving clutch 50 to integrally rotate the rear wheel-side output shaft 44 coupled to the clutch hub 78 and the drive gear 46 coupled to the clutch drum 80. For example, the required locking motor rotation angle calculation part 152*d* calculates the required locking motor rotation angle α (deg) by means of a predetermined map and based on the throttle valve opening degree θacc (%) detected by the throttle valve opening degree sensor 142.

When the first control section 152*a* executes the first control, a first control end determination part 152*e* provided in the first control section 152*a* determines whether or not to end the first control. For example, when the motor rotation angle θm (deg) increases to the required locking motor rotation angle α (deg), the first control end determination part 152*e* determines to end the first control. When the first control end determination part 152*e* determines to end the first control, the first control section 152*a* ends (stops) the first control it is executing.

When the first control end determination part 152*e* determines to end the first control, the second control section 152*b* provided in the electric motor controller 152 executes second control (rapid increase control) of controlling the motor rotation angle θm (deg) of the shaft 90a of the electric motor 90 to a wind-up motor rotation angle (first rotation angle) β (β>α) (deg) that is calculated by a wind-up motor rotation angle calculation part 152f to be described later. The second control is a control mode which is executed when the motor rotation angle θm (deg) is equal to the required locking motor rotation angle α (deg) and the piston 84 is pressing the frictional engagement element 82 such that the front wheel-driving clutch 50 is maintained in the fully engaged state, and in which the motor rotation angle θm (deg) is increased rapidly and temporarily from the required locking motor rotation angle α (deg) to the wind-up motor rotation angle β (deg), i.e., increased toward an increasing side on which the clutch pressing force F (N) of the front wheel-driving clutch 50 increases as the piston 84 further presses the frictional engagement element 82.

When the first control end determination part 152e determines to end the first control, the wind-up motor rotation angle calculation part 152f calculates the wind-up motor rotation angle β (deg) at which the clutch pressing force F (N) of the front wheel-driving clutch 50 increases by a predetermined value from that at the required locking motor rotation angle α (deg). For example, the wind-up motor rotation angle calculation part 152f calculates, as the wind-up motor rotation angle β (deg), a value (α+θc) obtained by adding a preset predetermined rotation angle θc (deg) to the required locking motor rotation angle α (deg) calculated by the required locking motor rotation angle calculation part 152d.

When the second control section 152b executes the second control, a second control end determination part 152g provided in the second control section 152b determines whether or not to end the second control. For example, when the motor rotation angle θm (deg) increases to the wind-up motor rotation angle β (deg), the second control end determination part 152g determines to end the second control. When the second control end determination part 152g determines to end the second control, the second control section 152b ends (stops) the second control it is executing.

When the second control end determination part 152g determines to end the second control, the third control section 152c provided in the electric motor controller 152 executes third control (gradual reduction control; rotation angle return control) of controlling the motor rotation angle θm (deg) of the shaft 90a of the electric motor 90 such that the motor rotation angle θm gradually decreases to a rewind-up-criteria motor rotation angle (second rotation angle) γ (γ=α) (deg) that is calculated by a rewind-up-criteria motor rotation angle calculation part 152h to be described later. The third control (gradual reduction control) is a control mode which is executed when the motor rotation angle θm (deg) is equal to the wind-up motor rotation angle β (deg), and in which the motor rotation angle θm (deg) is gradually reduced from the wind-up motor rotation angle β (deg) to the rewind-up-criteria motor rotation angle γ (deg), i.e., reduced toward a decreasing side on which the clutch pressing force F (N) of the front wheel-driving clutch 50 decreases.

When the second control end determination part 152g determines to end the second control, the rewind-up-criteria motor rotation angle calculation part 152h calculates, as the rewind-up-criteria motor rotation angle γ (γ=α) (deg), the required locking motor rotation angle α (deg) that is calculated by the required locking motor rotation angle calculation part 152d.

When the third control section 152c executes the third control, a third control end determination part 152i provided in the third control section 152c determines whether or not to end the third control. For example, when the motor rotation angle θm (deg) decreases to the rewind-up-criteria motor rotation angle γ (deg), the third control end determination part 152i determines to end the third control. When the third control end determination part 152i determines to end the third control, the third control section 152c ends (stops) the third control it is executing.

In the second control section 152b and the third control section 152c, when the third control end determination part 152i determines to end the third control, the second control is re-executed to rapidly and temporarily increase the motor rotation angle θm (deg) from the rewind-up-criteria motor rotation angle γ (deg) to the wind-up motor rotation angle β (deg). When the motor rotation angle θm (deg) increases to the wind-up motor rotation angle β (deg), the third control is re-executed to gradually reduce the motor rotation angle θm (deg) from the wind-up motor rotation angle β (deg) to the rewind-up-criteria motor rotation angle γ (deg). The second control and the third control are alternately and repeatedly executed until the H4L switch-on request determination part 150 determines that switching of the position of the piston 84 to the H4L position is not requested. In the second control section 152b and the third control section 152c, a first speed gradient (rate) θ1 (see FIG. 10) at which the motor rotation angle θm (deg) is increased from the rewind-up-criteria motor rotation angle γ (deg) to the wind-up motor rotation angle β (deg) by the second control section 152b is larger (higher) than a second speed gradient (rate) θ2 (see FIG. 10) at which the motor rotation angle θm (deg) is reduced from the wind-up motor rotation angle β (deg) to the rewind-up-criteria motor rotation angle γ (deg) by the third control section 152c. Moreover, the second speed gradient (rate) θ2 at which the motor rotation angle θm (deg) is reduced from the wind-up motor rotation angle β (deg) to the rewind-up-criteria motor rotation angle γ (deg) by the third control section 152c is a speed gradient (rate) that is preset so as to be smaller (lower) than the first speed gradient (rate) θ1 and such that the motor current Im (A) supplied to the electric motor 90 is appropriately reduced. Suppose that the second speed gradient (rate) θ2 is set to be smaller than a speed at which the piston 84 is returned by a reaction force resulting from the piston 84 pressing the frictional engagement element 82 with no current applied to the electric motor 90. Then, in FIG. 11 showing the efficiency characteristics of the clutch pressing force F (N) generated in the front wheel-driving clutch 50 relative to the motor current Im (A) supplied to the electric motor 90, the motor current Im supplied to the electric motor 90 assumes a current value on the first efficiency characteristic line L1 of the clutch pressing force F (N) of the front wheel-driving clutch 50 relative to the motor current Im (A) supplied to the electric motor 90 when the piston 84 is pressing the frictional engagement element 82 (the efficiency characteristic line on a piston pressing side). Therefore, the second speed gradient (rate) θ2 is set to as small (low) a speed gradient (rate) as possible, to such an extent as not to be smaller than the speed at which the piston 84 is returned by the reaction force resulting from the piston 84 pressing the frictional engagement element 82 with no current applied to the electric motor 90.

Figure 8:
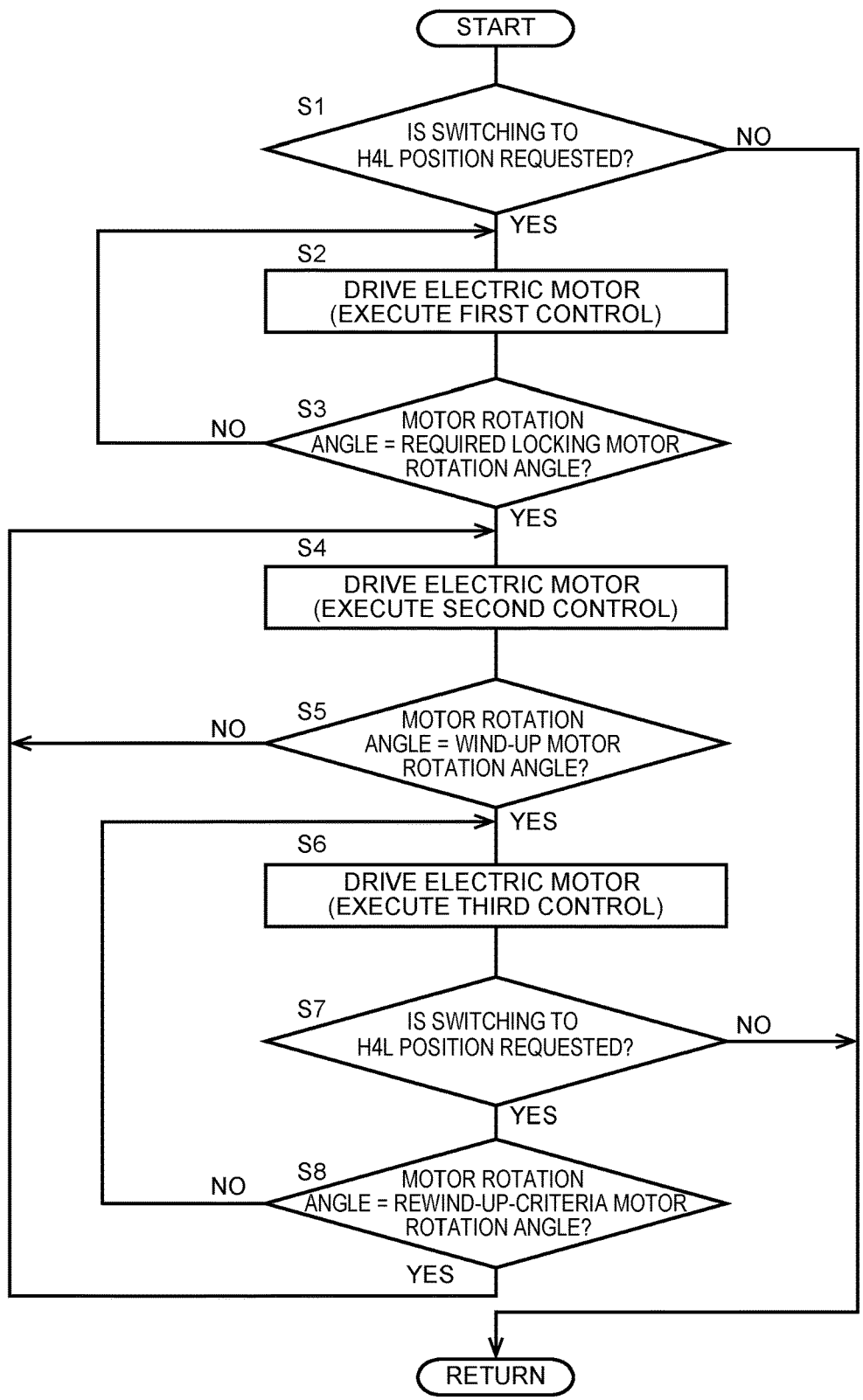
FIG. 8 is a flowchart illustrating a main part of control operations of the electronic control unit of FIG. 7 that involve controlling a motor rotation angle of the electric motor such that a piston is switched to an H4L position and that the front wheel-driving clutch is maintained in a fully engaged state.
Figure 9:
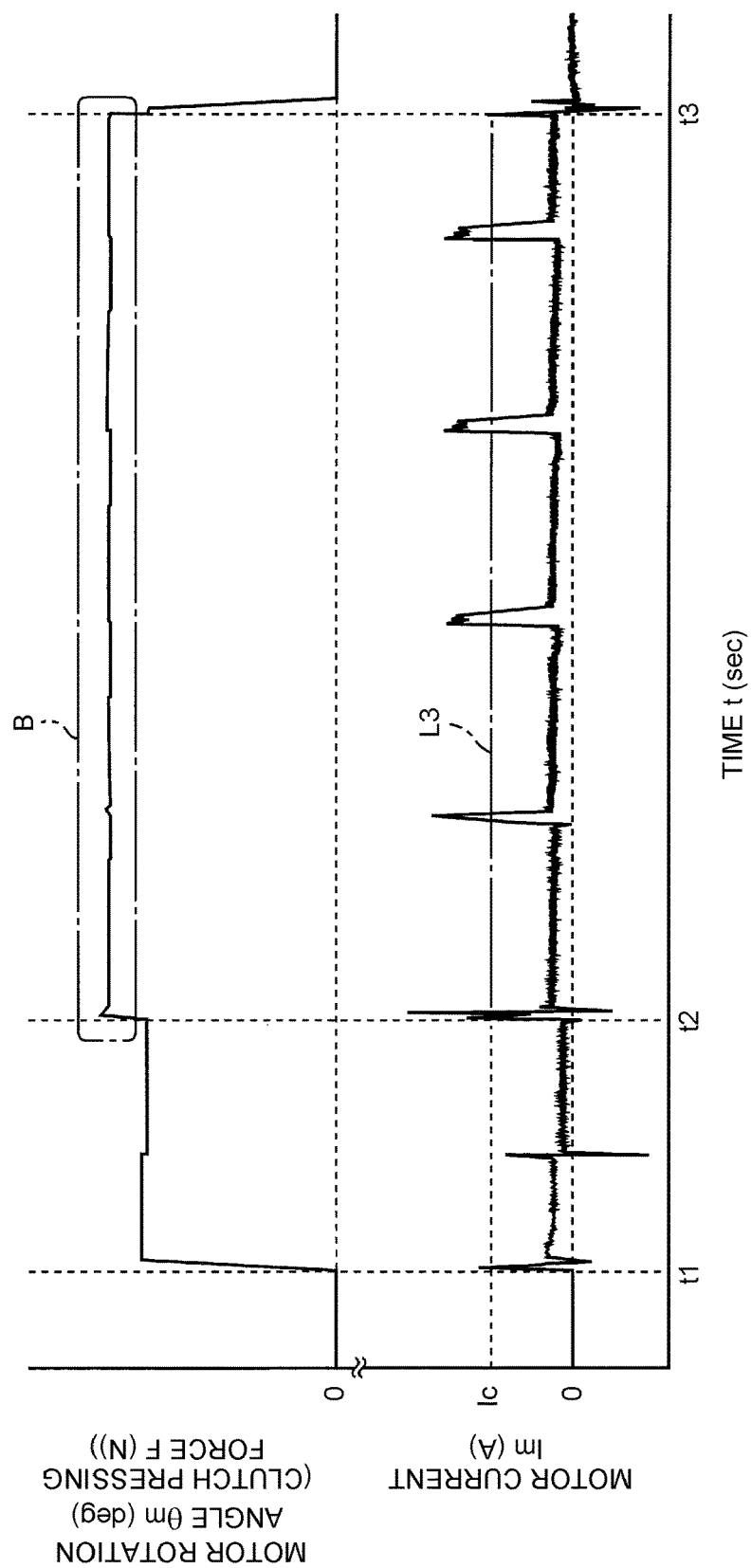
FIG. 9 is a view showing a time chart corresponding to the flowchart of FIG. 8 in execution.

FIG. 8 is a flowchart illustrating a main part of control operations of the electronic control unit 130 that involve controlling the motor rotation angle θm (deg) of the electric motor 90 such that the position of the piston 84 is switched to the H4L position and that the front wheel-driving clutch 50 is maintained in the fully engaged state. FIG. 9 and FIG.

10 are views showing time charts corresponding to the flowchart of FIG. 8 in execution.

First, in step (hereinafter "step" will be omitted) S1 corresponding to the function of the H4L position switch-on request determination part 150, it is determined whether or not switching of the position of the piston 84 to the H4L position is requested. When the determination result in step S1 is negative, the process returns to the starting point. When the determination result in S1 is affirmative (at time t1 in FIG. 9), S2 corresponding to the functions of the electric motor controller 152, the first control section 152a, the synchronization determination part 154, the front-side clutch controller 156, and the engagement determination part 156a is executed. In S2, the motor rotation angle θm is controlled such that the piston 84 moves to the position at which the piston 84 butts against (comes in contact with) the frictional engagement element 82, so that the rotation speed of the second rotary member 36c rises and synchronizes with the rotation speed of the first rotary member 36a, and the switching sleeve 36f is switched from the non-meshing position to the meshing position. Moreover, in S2, when the switching sleeve 36f is switched from the non-meshing position to the meshing position, the first control of controlling the motor rotation angle θm (deg) to the required locking motor rotation angle α (deg) is executed.

Next, in S3 corresponding to the function of the first control end determination part 152e, it is determined whether or not to end the first control, i.e., whether or not the motor rotation angle θm has increased to the required locking motor rotation angle α. When the determination result in S3 is negative, i.e., when the motor rotation angle θm is smaller than the required locking motor rotation angle α, the first control is executed in S2. When the determination result in S3 is affirmative (at time t2 in FIG. 9 and FIG. 10), S4 corresponding to the function of the second control section 152b is executed. In S4, the first control having been executed in S2 is ended (stopped), and the second control of controlling the motor rotation angle θm to the wind-up motor rotation angle β (deg) is executed.

Next, in S5 corresponding to the function of the second control end determination part 152g, it is determined whether or not to end the second control, i.e., whether or not the motor rotation angle θm has increased to the wind-up motor rotation angle β. When the determination result in S5 is negative, i.e., the motor rotation angle θm is smaller than the wind-up motor rotation angle β, the second control is executed in S4. When the determination result in S5 is affirmative (at time t2a in FIG. 10), S6 corresponding to the function of the third control section 152c is executed. In S6, the second control having been executed in S4 is ended, and the third control of controlling the motor rotation angle θm (deg) to the rewind-up-criteria motor rotation angle γ (deg) is executed. Next, in S7 corresponding to the function of the H4L switch-on request determination part 150, it is determined whether or not switching of the position of the piston 84 to the H4L position is requested. When the determination result in S7 is negative, S1 is executed. When the determination result in S7 is affirmative, S8 corresponding to the function of the third control end determination part 152i is executed.

In S8, it is determined whether or not to end the third control, i.e., whether or not the motor rotation angle θm has decreased to the rewind-up-criteria motor rotation angle γ. When the determination result in S8 is negative, i.e., when the motor rotation angle θm is larger than the rewind-up-criteria motor rotation angle γ, the third control is executed in S6. When the determination result in S8 is affirmative (at time t2b in FIG. 10), S4 is executed. In S4 to S8, the second control and the third control are alternately and repeatedly executed until the determination result in S7 becomes negative (at time t3 in FIG. 9 and FIG. 10).

FIG. 11 is a view showing the efficiency characteristics of the clutch pressing force F (N) generated in the front wheel-driving clutch 50 relative to the motor current Im (A) supplied to the electric motor 90 in the case where the worm gear 94 is used in the transfer 22. The first efficiency characteristic line L1 of FIG. 11 is a line showing the efficiency characteristic of the clutch pressing force F (N) of the front wheel-driving clutch 50, i.e., the motor rotation angle θm (deg), relative to the motor current Im (A) supplied to the electric motor 90 when the pressing force with which the piston 84 presses the frictional engagement element 82 is increasing (piston pressing side). The first efficiency characteristic line L1 is a line plotting a collection of pressing-side design values that are specified based on measurement data (the motor current Im, the motor rotation angle θm, etc.) obtained by experiments. The second efficiency characteristic line L2 of FIG. 11 is a line showing the efficiency characteristic of the clutch pressing force F (N) of the front wheel-driving clutch 50, i.e., the motor rotation angle θm (deg), relative to the motor current Im (A) supplied to the electric motor 90 when the pressing force with which the piston 84 presses the frictional engagement element 82 is decreasing (piston returning side). The second efficiency characteristic line L2 is a line plotting a collection of returning-side design values that are specified based on measurement data (the motor current Im, the motor rotation angle θm, etc.) obtained by experiments. As shown in FIG. 11, even when the motor rotation angle θm (deg) is the same, the efficiency characteristics are different between the increasing side (piston pressing side) on which the pressing force on the frictional engagement element 82 is increased and the decreasing side (piston returning side) on which the pressing force on the frictional engagement element 82 is reduced, and the motor current Im (A) on the piston pressing side is larger than the motor current Im (A) on the piston returning side.

Figure 11:
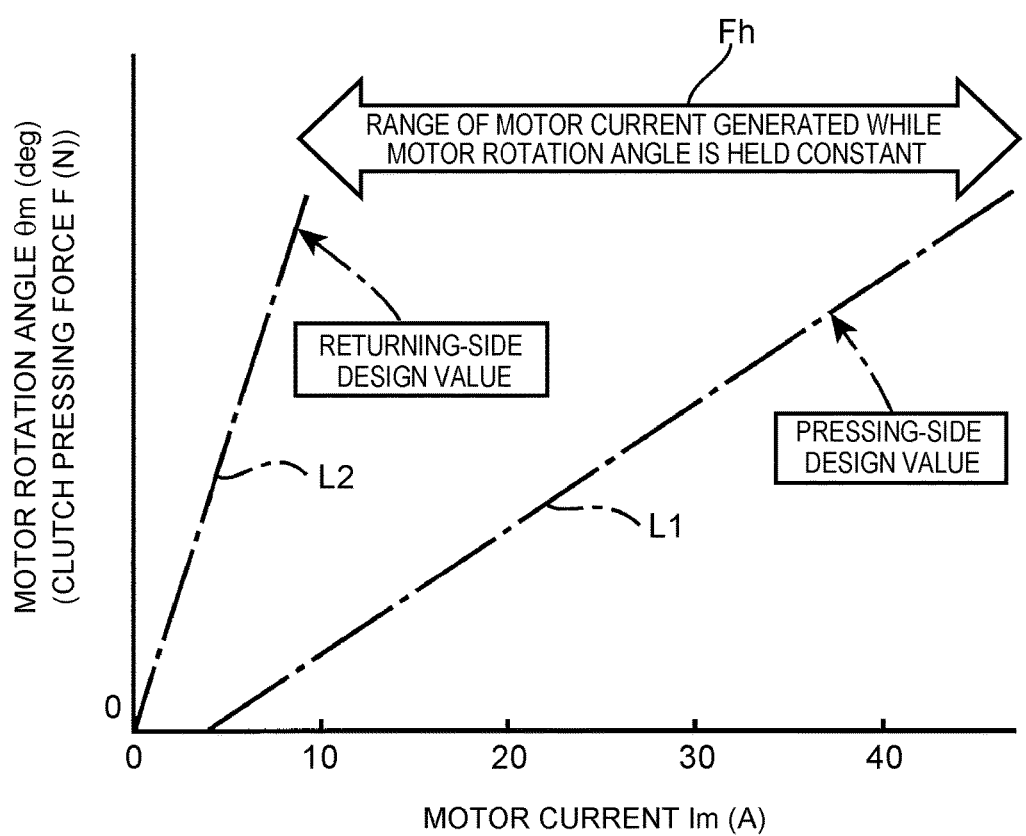
FIG. 11 is a view showing efficiency characteristics of a clutch pressing force generated in the front wheel-driving clutch relative to a motor current supplied to the electric motor.
Figure 12:
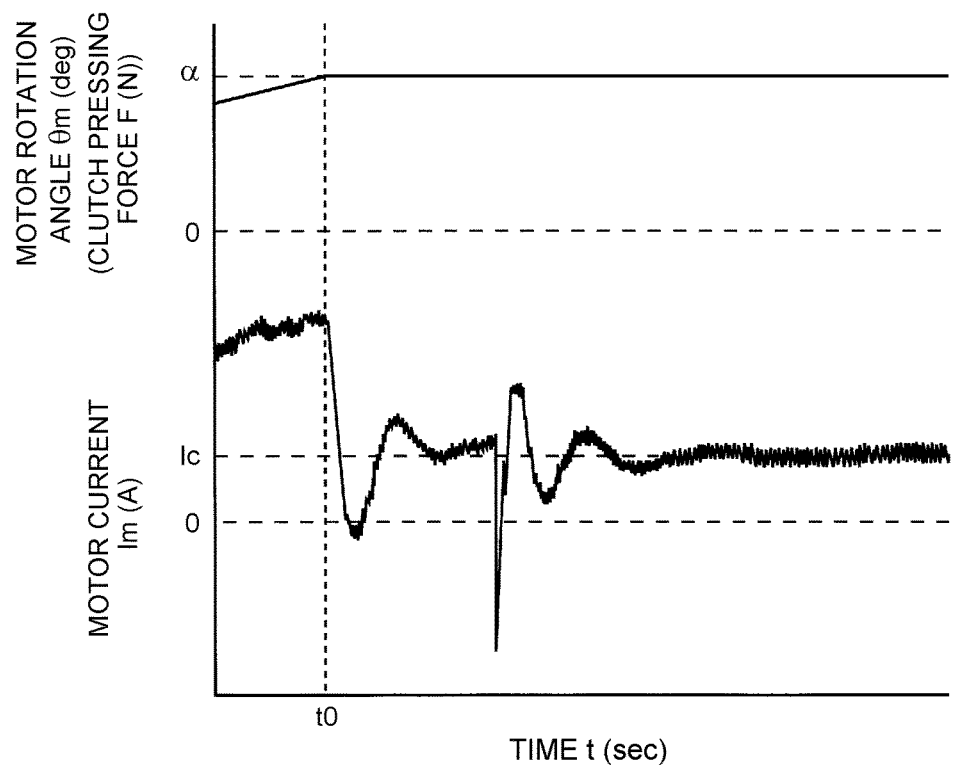
FIG. 12 is a view showing a state of the motor current supplied to the electric motor when, for example, unlike in an embodiment of the present disclosure, the motor rotation angle of the electric motor is controlled (feedback control) so as to maintain a required locking motor rotation angle that is calculated by a required locking motor rotation angle calculation part of an electric motor controller shown in FIG. 7.

FIG. 12 is a view showing the state of the motor current Im (A) supplied to the electric motor 90 when, for example, unlike in this embodiment, the motor rotation angle θm of the electric motor 90 is controlled (feedback control) such that the required locking motor rotation angle α (deg) calculated by the required locking motor rotation angle calculation part 152d of the electric motor controller 152 is maintained. As shown in FIG. 12, when feedback control of adjusting the motor current Im so as to keep the motor rotation angle θm (deg) of the electric motor 90 at the required locking motor rotation angle α (deg) is executed from time t0, the motor current Im (A) of the electric motor 90 initially becomes unstable, and then settles at a current value, for example, a current value Ic, somewhere between the first efficiency characteristic line L1 and the second efficiency characteristic line L2 as indicated by the arrow Fh in FIG. 11, at which the motor current Im (A) and the motor rotation angle θm (deg) are balanced in each case.

Figure 10:
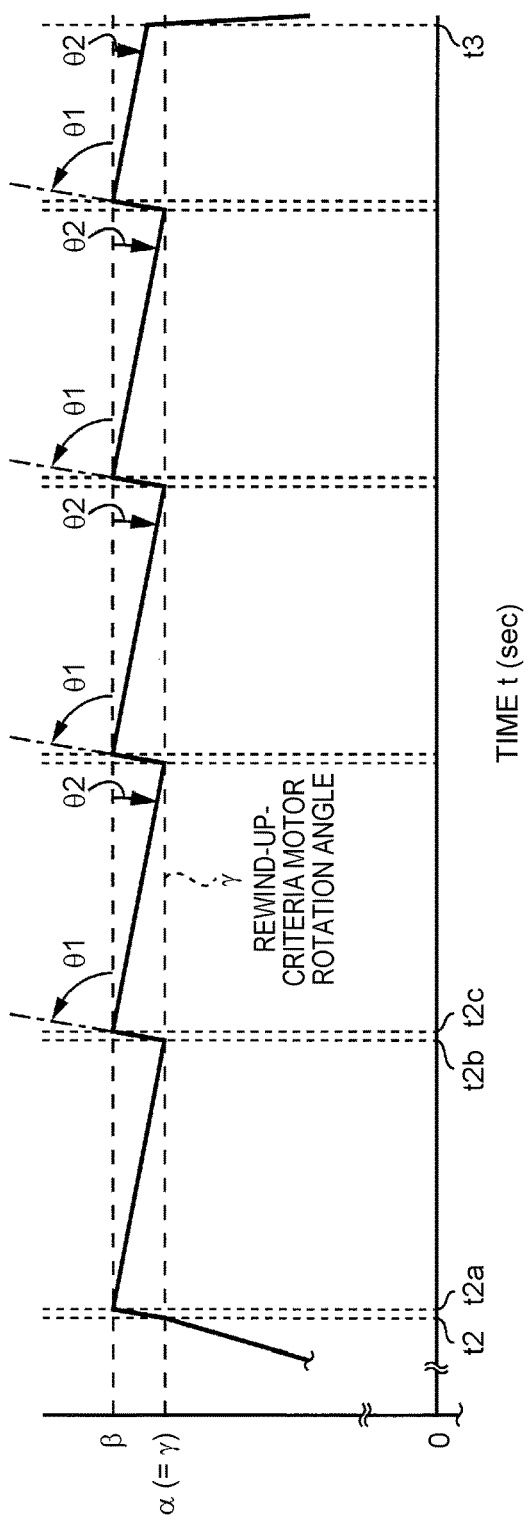
FIG. 10 is an enlarged view of the part of the time chart of FIG. 9 enclosed by one-dot dashed line.

FIG. 10 is an enlarged view of the part B of FIG. 9 enclosed by the one-dot dashed line. As shown in FIG. 10, in this embodiment, during the period in which the front wheel-driving clutch 50 is maintained in the fully engaged state (from time t2 to time t3), the duration of execution of the third control of reducing the motor rotation angle θm from the wind-up motor rotation angle β to the rewind-up-criteria motor rotation angle γ (from time t2a to time t2b) is longer than the duration of execution of the second control of increasing the motor rotation angle θm from the rewind-up-criteria motor rotation angle γ to the wind-up motor rotation angle β by pressing the frictional engagement element 82 by the piston 84 (from time t2b to time t2c). Thus, the second efficiency characteristic line L2 shown in FIG. 11 can be appropriately adopted, so that, as shown in FIG. 10, the average value of the motor current Im (A) supplied to the electric motor 90 while the front wheel-driving clutch 50 is maintained in the fully engaged state (from time t2 to time t3) is appropriately reduced compared with the current value Ic (A) shown in FIG. 12. The one-dot dashed line L3 shown in FIG. 9 is a virtual line indicating the current value Ic (A) shown in FIG. 12.

As has been described above, the electronic control unit 130 of the transfer 22 of this embodiment includes the electric motor controller 152 that controls the motor rotation angle θm of the electric motor 90. When the front wheel-driving clutch 50 is to be maintained in the fully engaged state such that the rear wheel-side output shaft 44 and the drive gear 46 rotate integrally, the electric motor controller 152 repeatedly executes the second control (rapid increase control) of rapidly increasing the motor rotation angle θm of the electric motor 90 at the first speed gradient θ1 to the wind-up motor rotation angle β larger than the required locking motor rotation angle α that is required to maintain the front wheel-driving clutch 50 in the fully engaged state, and the third control (gradual reduction control) of gradually reducing the motor rotation angle θm of the electric motor 90, which has been increased by the second control (rapid increase control), at the second speed gradient θ2 smaller than the first speed gradient θ1 to the rewind-up-criteria motor rotation angle γ that is set to be equal to the required locking motor rotation angle α. Thus, when the front wheel-driving clutch 50 is to be maintained in the fully engaged state such that the rear wheel-side output shaft 44 and the drive gear 46 rotate integrally, the third control (gradual reduction control) of gradually reducing the motor rotation angle θm of the electric motor 90 to the rewind-up-criteria motor rotation angle γ is executed by the electric motor controller 152. As a result, the motor current Im supplied to the electric motor 90 is adjusted to a lower current value on the second efficiency characteristic line L2 of the clutch pressing force F generated in the front wheel-driving clutch 50 relative to the motor current Im supplied to the electric motor 90 on the piston returning side. Therefore, the average current value of the motor current Im supplied to the electric motor 90 when the front wheel-driving clutch 50 is to be maintained in the fully engaged state is appropriately reduced, compared with if, for example, control is executed so as to keep the motor rotation angle θm of the electric motor 90 constantly at the required locking motor rotation angle α when the front wheel-driving clutch 50 is to be maintained in the fully engaged state.

According to the electronic control unit 130 of the transfer 22 of this embodiment, the second control is a control mode in which the motor rotation angle θm of the electric motor 90 is temporarily increased to the wind-up motor rotation angle β to increase the clutch pressing force F of the front wheel-driving clutch 50, while the third control is a control mode in which the motor rotation angle θm of the electric motor 90 is gradually reduced from the wind-up motor rotation angle β to the rewind-up-criteria motor rotation angle γ to reduce the clutch pressing force F of the front wheel-driving clutch 50. The second control consists in temporarily increasing the motor rotation angle θm of the electric motor 90 from the rewind-up-criteria motor rotation angle γ to the wind-up motor rotation angle β when the motor rotation angle θm of the electric motor 90 is reduced to the rewind-up-criteria motor rotation angle γ by the third control. Thus, when the front wheel-driving clutch 50 is to be maintained in the fully engaged state, the motor current Im supplied to the electric motor 90 is appropriately reduced during the execution of the third control of gradually reducing the motor rotation angle θm of the electric motor 90 from the wind-up motor rotation angle β to the rewind-up-criteria motor rotation angle γ to reduce the clutch pressing force F of the front wheel-driving clutch 50.

According to the electronic control unit 130 of the transfer 22 of this embodiment, the worm wheel 104a is a spur gear, and the shaft 90a of the electric motor 90 is disposed such that the third rotational axis C3 around which the shaft 90a rotates is inclined at an angle equal to the pitch angle θg of the worm 90b relative to the rotational plane A orthogonal to the first rotational axis C1 of the worm wheel 104a. Thus, the operation efficiency of the worm gear 94 in moving the worm wheel 104a in the direction of the first rotational axis C1 can be improved.

While the embodiment of the present disclosure has been described above in detail based on the drawings, other aspects of the present disclosure are also applicable.

For example, in the above-described embodiment, the screw mechanism 86 is a power conversion mechanism that converts a rotary motion of the nut member 88 around the first rotational axis C1 into a linear motion in the direction of the first rotational axis C1 by the screw action between the nut member 88 and the screw shaft member 96. Thus, the screw mechanism 86 presses the frictional engagement element 82 of the front wheel-driving clutch 50 through the piston 84 provided on the nut member 88, and thereby generates the clutch pressing force F (N) in the front wheel-driving clutch 50. However, any other power conversion mechanism than the screw mechanism 86, for example, a ball cam mechanism, may be used that generates the clutch pressing force F in the front wheel-driving clutch 50 by converting a rotary motion of the worm wheel 104a around the first rotational axis C1 into a linear motion in the direction of the first rotational axis C1.

In the above-described embodiment, the rewind-up-criteria motor rotation angle γ is set to the same value as the required locking motor rotation angle α (γ=α). Alternatively, for example, the rewind-up-criteria motor rotation angle γ may be set to a value larger than the required locking motor rotation angle α but smaller than the wind-up motor rotation angle β (α<γ<β).

In the above-described embodiment, the four-wheel-drive vehicle based on an FR configuration has been illustrated as the vehicle 10 to which the transfer 22 is applied. However, applications of the present disclosure are not limited to this example. For example, the vehicle 10 to which the transfer 22 is applied may be a four-wheel-drive vehicle based on a front-engine, front-wheel-drive (FF) configuration. While the front wheel-driving clutch 50 of the embodiment is a multiple-disc clutch, a single-disc clutch can also be adopted for the present disclosure.

The above-described embodiment is merely an example, and the present disclosure can be implemented in other forms with various modifications and improvements based on the knowledge of those skilled in the art.

What is claimed is:
1. A power transfer device for a vehicle, the power transfer device comprising:
  a friction clutch configured to adjust a transmission torque to be transmitted from an input rotary member to an output rotary member;

a motor;

a worm speed-reduction gear mechanism including a worm that is provided on a shaft of the motor and a worm wheel that meshes with the worm;

a conversion mechanism configured to generate a pressing force in the friction clutch by converting a rotary motion of the worm wheel into a linear motion; and an electronic control unit configured to control a rotation angle of the motor, the electronic control unit being configured to repeatedly execute rapid increase control and gradual reduction control when the friction clutch is to be maintained in a fully engaged state such that the input rotary member and the output rotary member rotate integrally, the rapid increase control being a control mode in which the rotation angle of the motor is increased to a first rotation angle at a first speed gradient, the first rotation angle being larger than a required rotation angle that is required to maintain the friction clutch in the fully engaged state, the gradual reduction control being a control mode in which the rotation angle of the motor having been increased by the rapid increase control is reduced to a second rotation angle at a second speed gradient, the second rotation angle being larger than or equal to the required rotation angle and smaller than the first rotation angle, the second speed gradient being smaller than the first speed gradient.

2. The power transfer device for the vehicle according to claim 1, wherein:

the electronic control unit is configured to temporarily increase the rotation angle of the motor from the second rotation angle to the first rotation angle by the rapid increase control when the rotation angle of the motor is reduced to the second rotation angle by the gradual reduction control; and the rapid increase control is a control mode in which the rotation angle of the motor is temporarily increased to the first rotation angle to increase the pressing force of the friction clutch, and the gradual reduction control is a control mode in which the rotation angle of the motor is reduced from the first rotation angle to the second rotation angle to reduce the pressing force of the friction clutch.

3. The power transfer device for the vehicle according to claim 1, wherein:

the worm wheel is a spur gear; and the shaft of the motor is disposed such that a rotational axis of the shaft is inclined at an angle equal to a pitch angle of the worm relative to a rotational plane that is orthogonal to a rotational axis of the worm wheel.

4. A control method of a power transfer device, the power transfer device including: a friction clutch configured to adjust a transmission torque to be transmitted from an input rotary member to an output rotary member; a motor; a worm speed-reduction gear mechanism including a worm that is provided on a shaft of the motor and a worm wheel that meshes with the worm; a conversion mechanism configured to generate a pressing force in the friction clutch by converting a rotary motion of the worm wheel into a linear motion; and an electronic control unit configured to control a rotation angle of the motor, the control method comprising repeatedly executing, by the electronic control unit, rapid increase control and gradual reduction control when the friction clutch is to be maintained in a fully engaged state such that the input rotary member and the output rotary member rotate integrally, the rapid increase control being a control mode in which the rotation angle of the motor is increased to a first rotation angle at a first speed gradient, the first rotation angle being larger than a required rotation angle that is required to maintain the friction clutch in the fully engaged state, the gradual reduction control being a control mode in which the rotation angle of the motor having been increased by the rapid increase control is reduced to a second rotation angle at a second speed gradient, the second rotation angle being larger than or equal to the required rotation angle and smaller than the first rotation angle, the second speed gradient being smaller than the first speed gradient.

* * * * *